US012628162B2

(12) United States Patent
Yuan et al.

(10) Patent No.: US 12,628,162 B2
(45) Date of Patent: May 12, 2026

(54) DEFAULT DOWNLINK OR UPLINK BEAM FOR DOWNLINK CONTROL CHANNEL WITH REPETITION CONFIGURATION

(71) Applicant: QUALCOMM Incorporated, San Diego, CA (US)

(72) Inventors: Fang Yuan, Beijing (CN); Yan Zhou, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 469 days.

(21) Appl. No.: 18/249,882

(22) PCT Filed: Dec. 21, 2020

(86) PCT No.: PCT/CN2020/137889

§ 371 (c)(1),
(2) Date: Jun. 30, 2023

(87) PCT Pub. No.: WO2022/133634

PCT Pub. Date: Jun. 30, 2022

(65) Prior Publication Data

US 2023/0397204 A1    Dec. 7, 2023

(51) Int. Cl.
*H04W 72/1273*    (2023.01)
*H04B 7/06*    (2006.01)
*H04W 72/232*    (2023.01)

(52) U.S. Cl.
CPC .... *H04W 72/1273* (2013.01); *H04B 7/06968* (2023.05); *H04W 72/232* (2023.01)

(58) Field of Classification Search
CPC ............ H04W 72/1273; H04W 72/232; H04B 7/06968
See application file for complete search history.

(56) References Cited

U.S. PATENT DOCUMENTS

| | | | |
|---|---|---|---|
| 10,939,457 B2 | 3/2021 | Sadiq et al. | |
| 11,057,166 B2 | 7/2021 | Nam et al. | |

(Continued)

FOREIGN PATENT DOCUMENTS

| | | |
|---|---|---|
| CN | 109845371 A | 6/2019 |
| CN | 110249573 A | 9/2019 |

(Continued)

OTHER PUBLICATIONS

Apple Inc: "Remaining Issues for Multi-TRP Enhancement," 3GPP TSG-RAN WG1 Meeting #102-e, R1-2006494, e-Meeting, Aug. 17-28, 2020, (Aug. 28, 2020), 8 pages, the whole document.

(Continued)

*Primary Examiner* — Jael M Ulysse
(74) *Attorney, Agent, or Firm* — Harrity & Harrity LLP

(57) ABSTRACT

In a wireless network, a physical downlink control channel (PDCCH) may be transmitted in multiple repetitions, which may cause ambiguity in cases where a user equipment (UE) has to determine a default downlink or uplink beam to receive or transmit a data channel. Accordingly, in cases where a UE receives a PDCCH associated with a repetition configuration and the PDCCH does not include a beam indication, the UE may determine a default beam to receive or transmit a data channel scheduled by the PDCCH based on the repetition configuration of the PDCCH. For example, the PDCCH may be associated with multiple control resource sets (CORESETs) and/or a CORESET associated with multiple transmission configuration indication (TCI) states. Accordingly, the UE may determine the default beam based on one or more parameters associated with the multiple CORESETs and/or the multiple TCIs associated with a CORESET.

30 Claims, 19 Drawing Sheets

(56) References Cited

U.S. PATENT DOCUMENTS

| | | | | |
|---|---|---|---|---|
| 12,119,916 | B2 * | 10/2024 | Zhang | H04W 72/12 |
| 2020/0077395 | A1 | 3/2020 | Guo | |
| 2020/0195334 | A1 | 6/2020 | Zhou et al. | |
| 2021/0219336 | A1 * | 7/2021 | Fan | H04W 74/006 |
| 2021/0400700 | A1 * | 12/2021 | Wang | H04L 5/0094 |
| 2022/0070899 | A1 * | 3/2022 | Huang | H04W 72/23 |
| 2022/0116859 | A1 * | 4/2022 | Park | H04W 72/02 |
| 2022/0132549 | A1 * | 4/2022 | Yu | H04L 1/1861 |
| 2022/0210818 | A1 * | 6/2022 | Cirik | H04W 72/232 |
| 2022/0210862 | A1 * | 6/2022 | Cirik | H04L 5/0091 |
| 2023/0046727 | A1 * | 2/2023 | Jung | H04W 16/28 |
| 2023/0047603 | A1 * | 2/2023 | Kim | H04L 5/0035 |
| 2023/0115642 | A1 * | 4/2023 | Matsumura | H04L 5/0053 370/329 |
| 2023/0130217 | A1 * | 4/2023 | Matsumura | H04L 5/0023 370/329 |
| 2023/0155783 | A1 * | 5/2023 | Liu | H04L 5/0053 370/329 |
| 2023/0396307 | A1 * | 12/2023 | Bhamri | H04B 7/06952 |

FOREIGN PATENT DOCUMENTS

| | | |
|---|---|---|
| CN | 111066370 A | 4/2020 |
| CN | 111543097 A | 8/2020 |
| WO | 2019099659 A1 | 5/2019 |
| WO | 2019160713 | 8/2019 |
| WO | 2019160721 A1 | 8/2019 |
| WO | 2020146816 | 7/2020 |

OTHER PUBLICATIONS

International Search Report and Written Opinion—PCT/CN2020/137889—ISA/EPO—Sep. 24, 2021.

Supplementary European Search Report—EP20966215—Search Authority—Munich—Dec. 11, 2024.

Supplementary Partial European Search Report—EP20966215—Search Authority—Munich—Aug. 8, 2024.

* cited by examiner

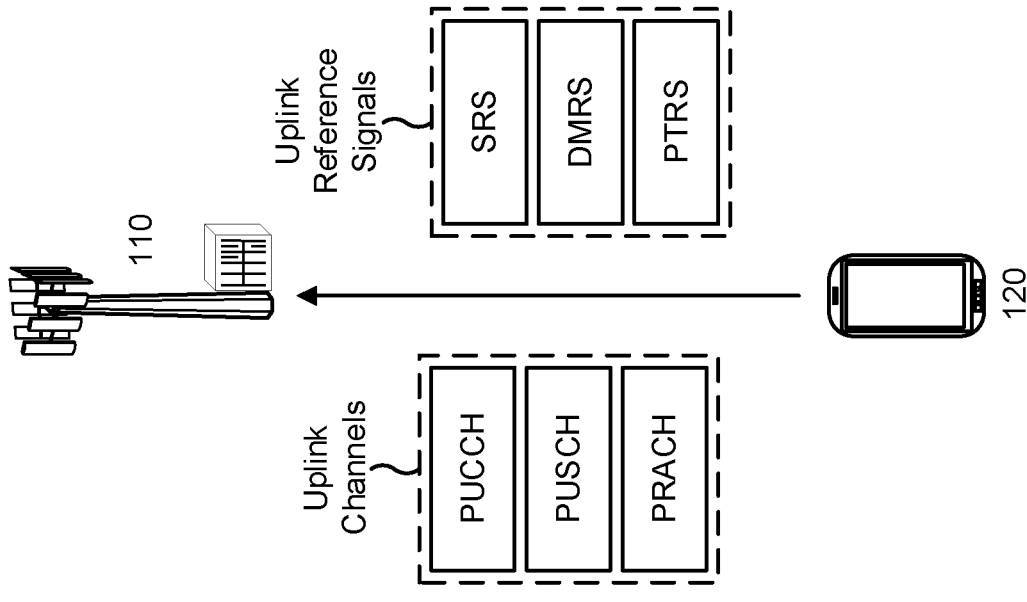
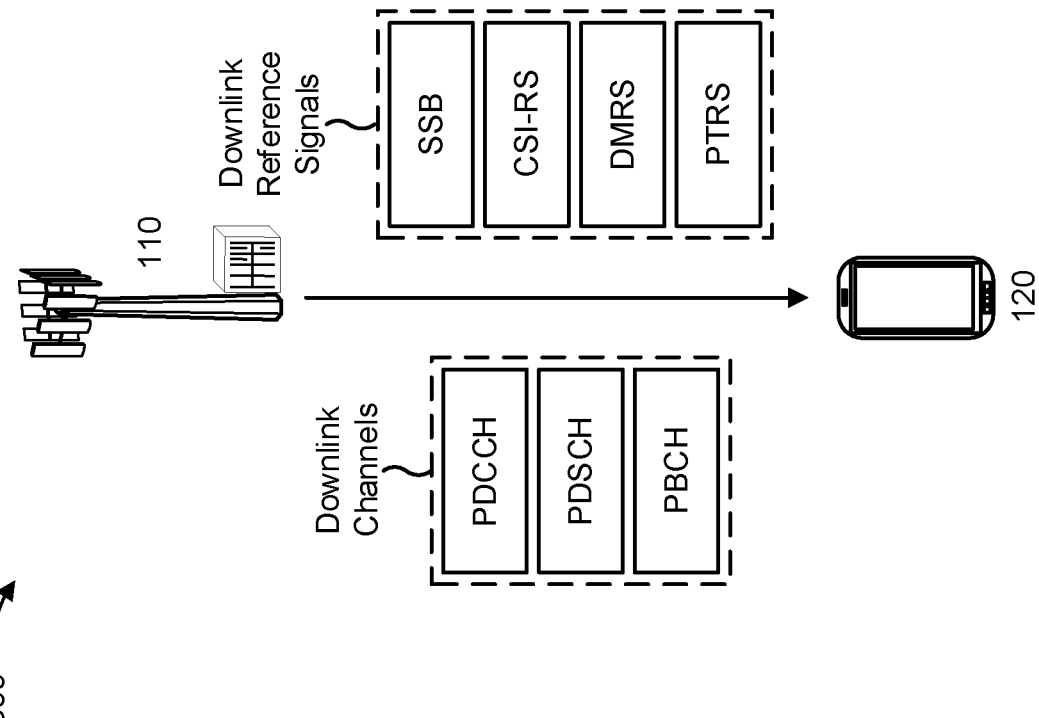
FIG. 3

Base station 110

UE 120

800

812
Determine default PUSCH beam based on DCI repetition configuration

810
Receive PDCCH carrying DCI scheduling PUSCH

814
Transmit PUSCH using default beam

820

CORESET

PUSCH

SFN PDCCH with multiple TCI states scheduling PUSCH without repetition

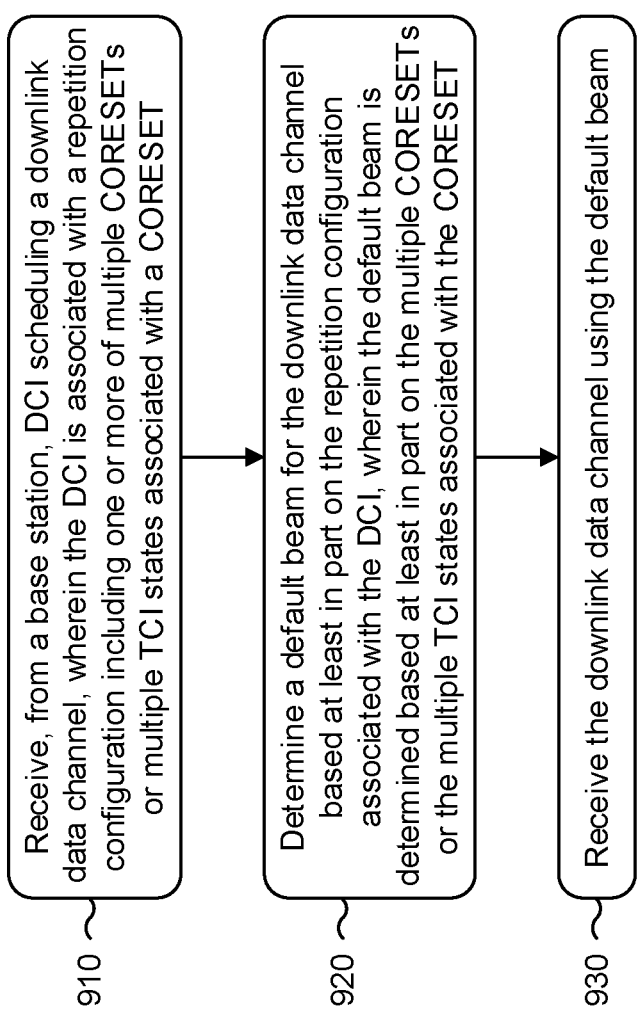

910 Receive, from a base station, DCI scheduling a downlink data channel, wherein the DCI is associated with a repetition configuration including one or more of multiple CORESETs or multiple TCI states associated with a CORESET 920 Determine a default beam for the downlink data channel based at least in part on the repetition configuration associated with the DCI, wherein the default beam is determined based at least in part on the multiple CORESETs or the multiple TCI states associated with the CORESET 930 Receive the downlink data channel using the default beam

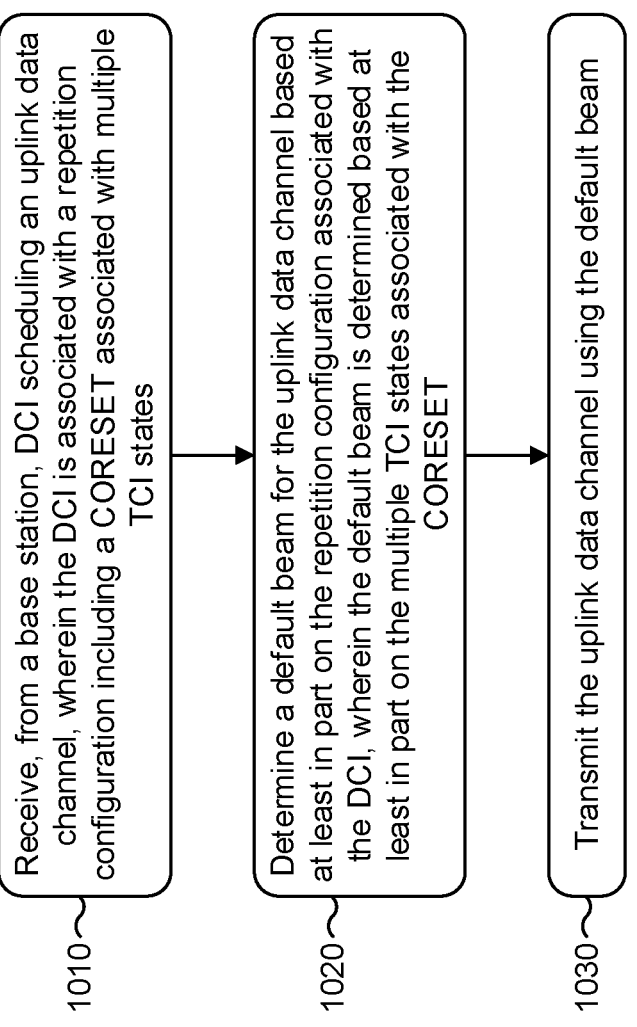

1010 — Receive, from a base station, DCI scheduling an uplink data channel, wherein the DCI is associated with a repetition configuration including a CORESET associated with multiple TCI states 1020 — Determine a default beam for the uplink data channel based at least in part on the repetition configuration associated with the DCI, wherein the default beam is determined based at least in part on the multiple TCI states associated with the CORESET 1030 — Transmit the uplink data channel using the default beam

DEFAULT DOWNLINK OR UPLINK BEAM FOR DOWNLINK CONTROL CHANNEL WITH REPETITION CONFIGURATION

CROSS-REFERENCE TO RELATED APPLICATION

This application is a 371 national stage of PCT Application No. PCT/CN2020/137889, filed on Dec. 21, 2020, entitled "DEFAULT DOWNLINK OR UPLINK BEAM FOR DOWNLINK CONTROL CHANNEL WITH REPETITION CONFIGURATION," which is hereby expressly incorporated by reference herein.

FIELD OF THE DISCLOSURE

Aspects of the present disclosure generally relate to wireless communication and to techniques and apparatuses for determining a default downlink or uplink beam for a downlink control channel with a repetition configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In a wireless network, a base station may transmit a physical downlink control channel (PDCCH) with multiple repetitions to improve reliability and/or robustness. For example, one PDCCH repetition technique may be to transmit one downlink control information (DCI) message in two search spaces that are associated with two control resource sets (CORESETs). In another PDCCH repetition technique, one DCI message may be transmitted in one CORESET associated with two transmission configuration indication (TCI) states (e.g., using two beams pointing in different directions). However, the PDCCH repetition may create ambiguity in cases where the UE has to determine a default downlink or uplink beam to receive or transmit a data channel (e.g., a physical downlink shared channel (PDSCH) or a physical uplink shared channel (PUSCH)) scheduled by the DCI message (e.g., because the DCI message does not have a TCI field).

For example, when a UE receives a DCI without a TCI field in a wireless network that does not support PDCCH repetition, the UE generally determines a default beam to receive a PDSCH or transmit a PUSCH scheduled by the DCI based on a TCI state, a quasi co-location (QCL) assumption, a search space, and/or another suitable parameter associated with a CORESET used to transmit the PDCCH. Accordingly, when the PDCCH is associated with multiple CORESETs and/or one or more CORESETs that are associated with multiple TCI states, the UE may be unable to determine a beam to use to receive a PDSCH or transmit a PUSCH scheduled by the DCI in cases where the PDCCH does not indicate a downlink or uplink beam.

Some aspects described herein relate to techniques and apparatuses to determine a default downlink beam or a default uplink beam in cases where a PDCCH is associated with a repetition configuration that includes multiple CORESETs and/or a CORESET associated with multiple TCI states. For example, in some aspects, the PDCCH may be associated with multiple CORESETs and may schedule a PDSCH without repetitions, in which case the UE may determine the default beam for the PDSCH based on a TCI state or a QCL assumption applied for one of the multiple CORESETs. In some aspects, in cases where the PDCCH includes a CORESET associated with multiple TCI states, the UE may determine the default beam for receiving a PDSCH without repetitions based on one of the TCI states associated with the CORESET. Alternatively, in cases where the PDCCH schedules a PDSCH with repetitions, the UE may map TCI states associated with different CORESETs and/or different TCI states associated with a CORESET to different sets of PDSCH reception occasions. Furthermore, when the PDCCH schedules a PUSCH and includes a CORESET associated with multiple TCI states, the UE may determine the default beam based on one of the TCI states associated with the CORESET in cases where the PUSCH is configured without repetitions or based on a mapping of the TCI states associated with the CORESET to different sets of PUSCH transmission occasions in cases where the PUSCH is configured with repetitions.

In some aspects, a method of wireless communication performed by a UE includes receiving, from a base station, DCI scheduling a downlink data channel, wherein the DCI is associated with a repetition configuration including one or more of multiple CORESETs or multiple TCI states associated with a CORESET; determining a default beam for the downlink data channel based at least in part on the repetition configuration associated with the DCI, wherein the default beam is determined based at least in part on the multiple CORESETs or the multiple TCI states associated with the CORESET; and receiving the downlink data channel using the default beam.

In some aspects, a method of wireless communication performed by a UE includes receiving, from a base station, DCI scheduling an uplink data channel, wherein the DCI is associated with a repetition configuration including a CORESET associated with multiple TCI states; determining a default beam for the uplink data channel based at least in part on the repetition configuration associated with the DCI, wherein the default beam is determined based at least in part on the multiple TCI states associated with the CORESET; and transmitting the uplink data channel using the default beam.

In some aspects, a UE includes one or more memories and one or more processors, communicatively coupled to the one or more memories, configured to: receive, from a base station, DCI scheduling a downlink data channel, wherein the DCI is associated with a repetition configuration including one or more of multiple CORESETs or multiple TCI states associated with a CORESET; determine a default beam for the downlink data channel based at least in part on the repetition configuration associated with the DCI, wherein the default beam is determined based at least in part on the multiple CORESETs or the multiple TCI states associated with the CORESET; and receive the downlink data channel using the default beam.

In some aspects, a UE includes one or more memories and one or more processors, communicatively coupled to the one or more memories, configured to: receive, from a base station, DCI scheduling an uplink data channel, wherein the DCI is associated with a repetition configuration including a CORESET associated with multiple TCI states; determine a default beam for the uplink data channel based at least in part on the repetition configuration associated with the DCI, wherein the default beam is determined based at least in part on the multiple TCI states associated with the CORESET; and transmit the uplink data channel using the default beam.

In some aspects, a non-transitory computer-readable medium storing a set of instructions for wireless communication includes one or more instructions that, when executed by one or more processors of a UE, cause the UE to: receive, from a base station, DCI scheduling a downlink data channel, wherein the DCI is associated with a repetition configuration including one or more of multiple CORESETs or multiple TCI states associated with a CORESET; determine a default beam for the downlink data channel based at least in part on the repetition configuration associated with the DCI, wherein the default beam is determined based at least in part on the multiple CORESETs or the multiple TCI states associated with the CORESET; and receive the downlink data channel using the default beam.

In some aspects, a non-transitory computer-readable medium storing a set of instructions for wireless communication includes one or more instructions that, when executed by one or more processors of a UE, cause the UE to: receive, from a base station, DCI scheduling an uplink data channel, wherein the DCI is associated with a repetition configuration including a CORESET associated with multiple TCI states; determine a default beam for the uplink data channel based at least in part on the repetition configuration associated with the DCI, wherein the default beam is determined based at least in part on the multiple TCI states associated with the CORESET; and transmit the uplink data channel using the default beam.

In some aspects, an apparatus for wireless communication includes means for receiving, from a base station, DCI scheduling a downlink data channel, wherein the DCI is associated with a repetition configuration including one or more of multiple CORESETs or multiple TCI states associated with a CORESET; means for determining a default beam for the downlink data channel based at least in part on the repetition configuration associated with the DCI, wherein the default beam is determined based at least in part on the multiple CORESETs or the multiple TCI states associated with the CORESET; and means for receiving the downlink data channel using the default beam.

In some aspects, an apparatus for wireless communication includes means for receiving, from a base station, DCI scheduling an uplink data channel, wherein the DCI is associated with a repetition configuration including a CORESET associated with multiple TCI states; means for determining a default beam for the uplink data channel based at least in part on the repetition configuration associated with the DCI, wherein the default beam is determined based at least in part on the multiple TCI states associated with the CORESET; and means for transmitting the uplink data channel using the default beam.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIG. 3 is a diagram illustrating an example of physical channels and reference signals in a wireless network.

FIGS. 9-10 are flowcharts of example methods of wireless communication.

DETAILED DESCRIPTION

Figure 1:
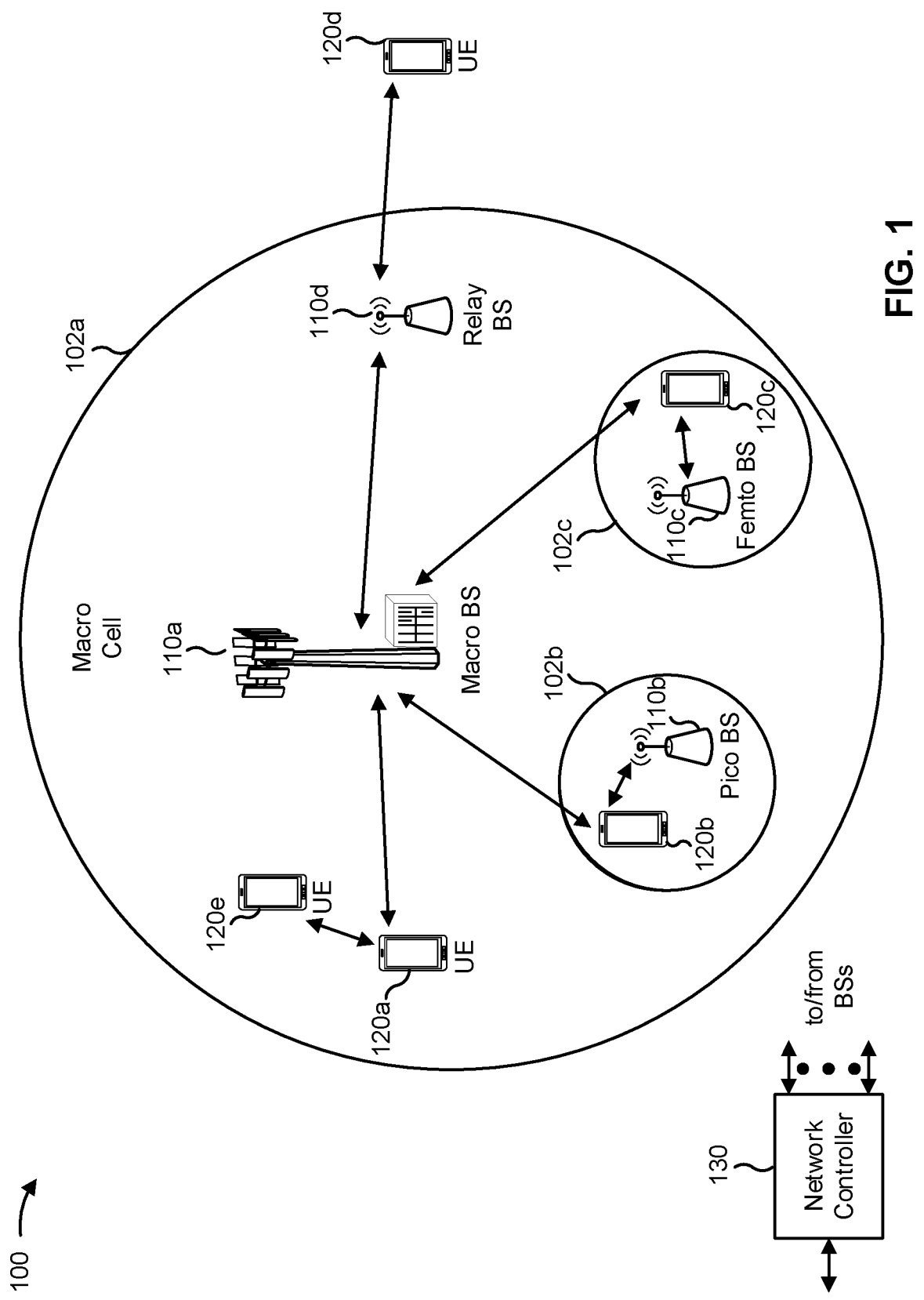
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as a 5G BS, a Node B, a gNB, a 5G NB, an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, or the like.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a base station 110 may transmit, to a UE 120, a physical downlink control channel (PDCCH) that carries downlink control information (DCI) to dynamically schedule a downlink data channel (e.g., a physical downlink shared channel (PDSCH)) or an uplink data channel (e.g., a physical uplink shared channel (PUSCH)). Furthermore, in some cases, the base station 110 may transmit the PDCCH with multiple repetitions to improve reliability and/or robustness. For example, one PDCCH repetition technique may be to transmit the DCI in two search spaces that are associated with two control resource sets (CORESETs). In another PDCCH repetition technique, the DCI may be transmitted in one CORESET associated with two transmission configuration indication (TCI) states (e.g., using a single frequency network (SFN) scheme where two beams are associated with the same time and frequency resources, or using a non-SFN scheme where two beams are associated with different time and frequency resources in the same CORESET). In some aspects, the UE 120 may be configured to follow one or more rules to determine a default beam to receive the PDSCH in cases where the scheduling DCI lacks a beam indication and/or to transmit the PUSCH in cases where the PUSCH is not associated with an uplink TCI state or any spatial relation.

For example, in some aspects, the PDCCH may be associated with multiple CORESETs and may schedule a PDSCH without repetitions, in which case the UE 120 may determine the default beam for the PDSCH based on a TCI state or a quasi co-location (QCL) assumption applied for one of the multiple CORESETs. Additionally, or alternatively, in cases where the PDCCH includes a CORESET associated with multiple TCI states, the UE 210 may determine the default beam for receiving a PDSCH without repetitions based on one of the TCI states associated with the CORESET. Alternatively, in cases where the PDCCH schedules a PDSCH with repetitions, the UE 120 may map TCI states associated with different CORESETs and/or different TCI states associated with a CORESET to different sets of PDSCH reception occasions. Furthermore, when the PDCCH schedules a PUSCH and includes a CORESET associated with multiple TCI states, the UE 120 may determine the default beam based on one of the TCI states associated with the CORESET when the PUSCH is configured without repetitions or based on a mapping of the TCI states associated with the CORESET to different sets of PUSCH transmission occasions when the PUSCH is configured with repetitions.

As indicated above, FIG. 1 is provided as an example. Other examples may differ from what is described with regard to FIG. 1.

Figure 2:
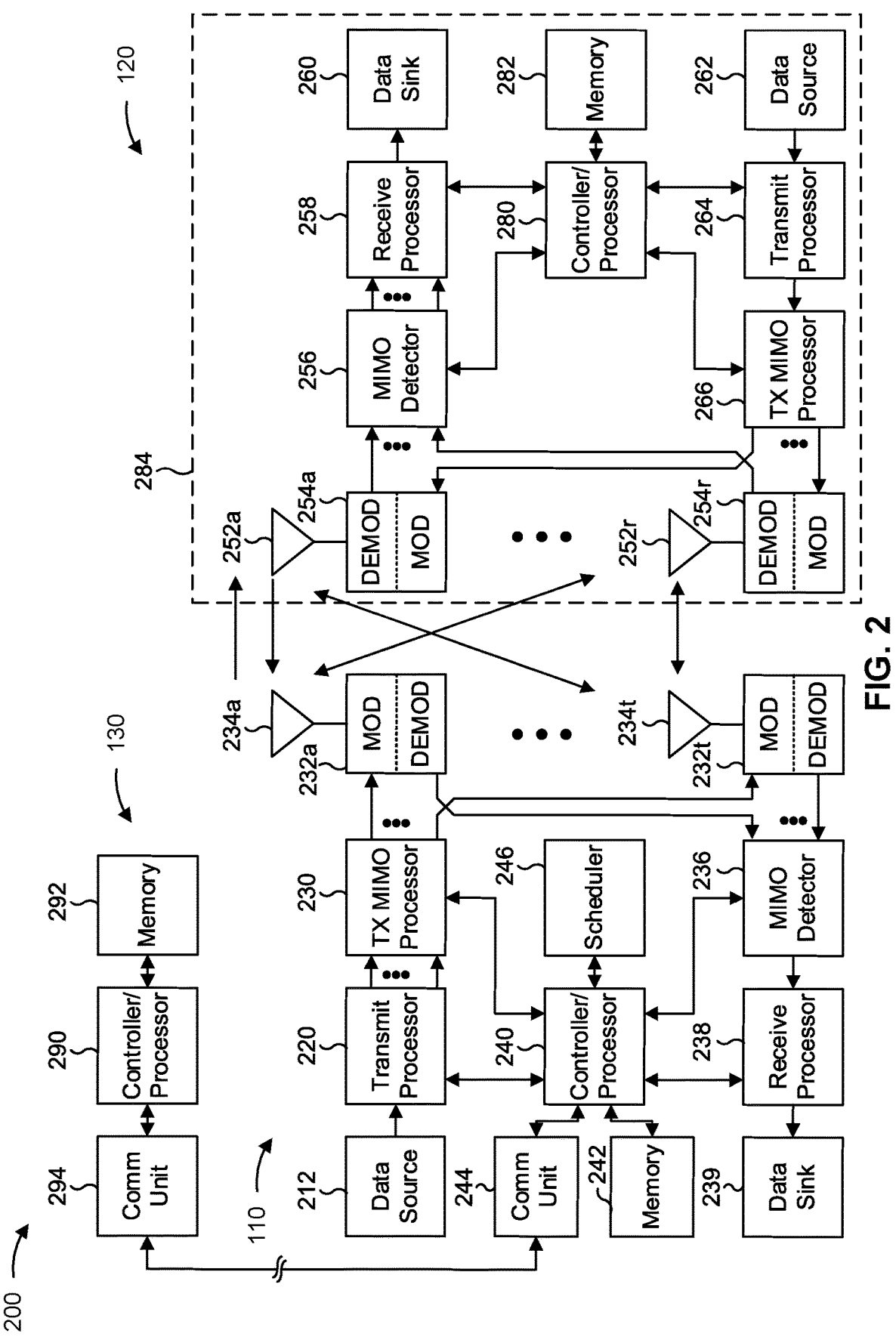
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS), a phase tracking reference signal (PTRS), and/or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein. A scheduler 246 may schedule UEs for data transmission on the downlink and/or uplink.

Controller/processor 240 of base station 110, controller/processor 280 of UE 120, and/or any other component(s) of FIG. 2 may perform one or more techniques associated with determining a default downlink or uplink beam for a downlink control channel with a repetition configuration, as described in more detail elsewhere herein. For example, controller/processor 240 of base station 110, controller/processor 280 of UE 120, and/or any other component(s) of FIG. 2 may perform or direct operations of, for example, method 900 of FIG. 9, method 1000 of FIG. 10, and/or other methods as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 900 of FIG. 9, method 1000 of FIG. 10, and/or other methods as described herein. In some aspects, executing instructions may include running the instructions, converting the instructions, compiling the instructions, and/or interpreting the instructions, among other examples.

In some aspects, the UE 120 includes means for receiving, from a base station, DCI scheduling a downlink data channel, wherein the DCI is associated with a repetition configuration including one or more of multiple CORESETs or multiple TCI states associated with a CORESET; means for determining a default beam for the downlink data channel based at least in part on the repetition configuration associated with the DCI, wherein the default beam is determined based at least in part on the multiple CORESETs or the multiple TCI states associated with the CORESET; or means for receiving the downlink data channel using the default beam. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

Additionally, or alternatively, in some aspects, the UE 120 includes means for receiving, from a base station, DCI scheduling an uplink data channel, wherein the DCI is associated with a repetition configuration including a CORESET associated with multiple TCI states; means for determining a default beam for the uplink data channel based at least in part on the repetition configuration associated with the DCI, wherein the default beam is determined based at least in part on the multiple TCI states associated with the CORESET; or means for transmitting the uplink data channel using the default beam. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

FIG. 3 is a diagram illustrating an example 300 of physical channels and reference signals in a wireless network. As shown in FIG. 3, downlink channels and downlink reference signals may carry information from a base station 110 to a UE 120, and uplink channels and uplink reference signals may carry information from a UE 120 to a base station 110.

As shown, a downlink channel may include a PDCCH that carries DCI, a PDSCH that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a PUSCH that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, or a PTRS, among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and/or a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
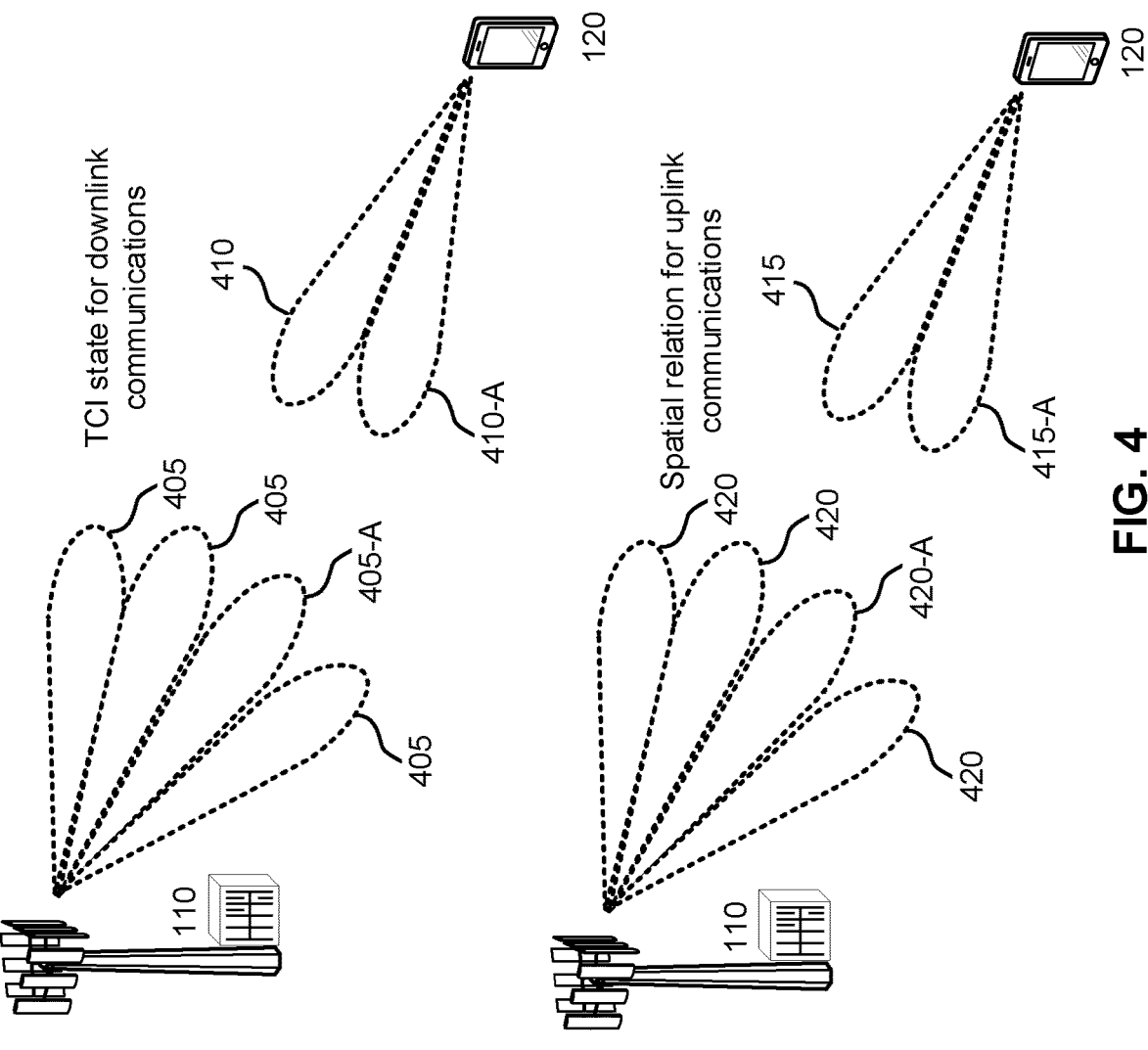
FIG. 4 is a diagram illustrating an example of using beams for communications between a base station and a UE.

FIG. 4 is a diagram illustrating an example 400 of using beams for communications between a base station and a UE. As shown in FIG. 4, a base station 110 and a UE 120 may use the beams to communicate with one another in a wireless network (e.g., wireless network 100). The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 405.

The UE 120 may attempt to receive downlink transmissions via one or more UE receive beams 410, which may be configured using different beamforming parameters at receive circuitry of the UE 120. The UE 120 may identify a particular BS transmit beam 405, shown as BS transmit beam 405-A, and a particular UE receive beam 410, shown as UE receive beam 410-A, that provide relatively favorable performance (e.g., that have a best channel quality of the different measured combinations of BS transmit beams 405 and UE receive beams 410). In some examples, the UE 120 may transmit an indication of which BS transmit beam 405 is identified by the UE 120 as a preferred BS transmit beam, which the base station 110 may select for transmissions to the UE 120. The UE 120 may thus attain and maintain a beam pair link (BPL) with the base station 110 for downlink communications (e.g., a combination of the BS transmit beam 405-A and the UE receive beam 410-A), which may be further refined and maintained in accordance with one or more established beam refinement procedures.

A downlink beam, such as a BS transmit beam 405 or a UE receive beam 410, may be associated with a TCI state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 405 may be associated with an SSB, and the UE 120 may indicate a preferred BS transmit beam 405 by transmitting uplink transmissions in resources of the SSB that are associated with the preferred BS transmit beam 405. A particular SSB may have an associated TCI state (e.g., for an antenna port or for beamforming). The base station 110 may, in some examples, indicate a downlink BS transmit beam 405 based at least in part on antenna port QCL properties that may be indicated by the TCI state. A TCI state may be associated with one downlink reference signal set (e.g., an SSB and an aperiodic, periodic, or semi-persistent CSI-RS) for different QCL types (e.g., QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the base station 110 indicating a BS transmit beam 405 via a TCI indication.

The base station 110 may maintain a set of activated TCI states for downlink data channel transmissions and a set of activated TCI states for downlink control channel transmissions. The set of activated TCI states for downlink data channel transmissions may correspond to beams that the base station 110 uses for downlink transmission on a PDSCH. The set of activated TCI states for downlink control channel communications may correspond to beams that the base station 110 may use for downlink transmission on a PDCCH or in a CORESET. The UE 120 may also maintain a set of activated TCI states for receiving the downlink data channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (e.g., activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 415.

The base station 110 may receive uplink transmissions via one or more BS receive beams 420. The base station 110 may identify a particular UE transmit beam 415, shown as UE transmit beam 415-A, and a particular BS receive beam 420, shown as BS receive beam 420-A, that provide relatively favorable performance (e.g., that have a best channel quality of the different measured combinations of UE transmit beams 415 and BS receive beams 420). In some examples, the base station 110 may transmit an indication of which UE transmit beam 415 is identified by the base station 110 as a preferred UE transmit beam, which the base station 110 may select for transmissions from the UE 120. The UE 120 and the base station 110 may thus attain and maintain a BPL for uplink communications (e.g., a combination of the UE transmit beam 415-A and the BS receive beam 420-A), which may be further refined and maintained in accordance with one or more established beam refinement procedures. An uplink beam, such as a UE transmit beam 415 or a BS receive beam 420, may be associated with a spatial relation. A spatial relation may indicate a directionality or a characteristic of the uplink beam, similar to one or more QCL properties, as described above. Additionally, or alternatively, in a wireless network that supports a unified downlink and uplink TCI framework, an uplink beam may be associated with an uplink TCI state or a joint downlink and uplink TCI state (e.g., where the BPL for downlink communications the BPL for uplink communications are associated with the same SSB).

As indicated above, FIG. 4 is provided as an example. Other examples may differ from what is described with respect to FIG. 4.

Figure 5:
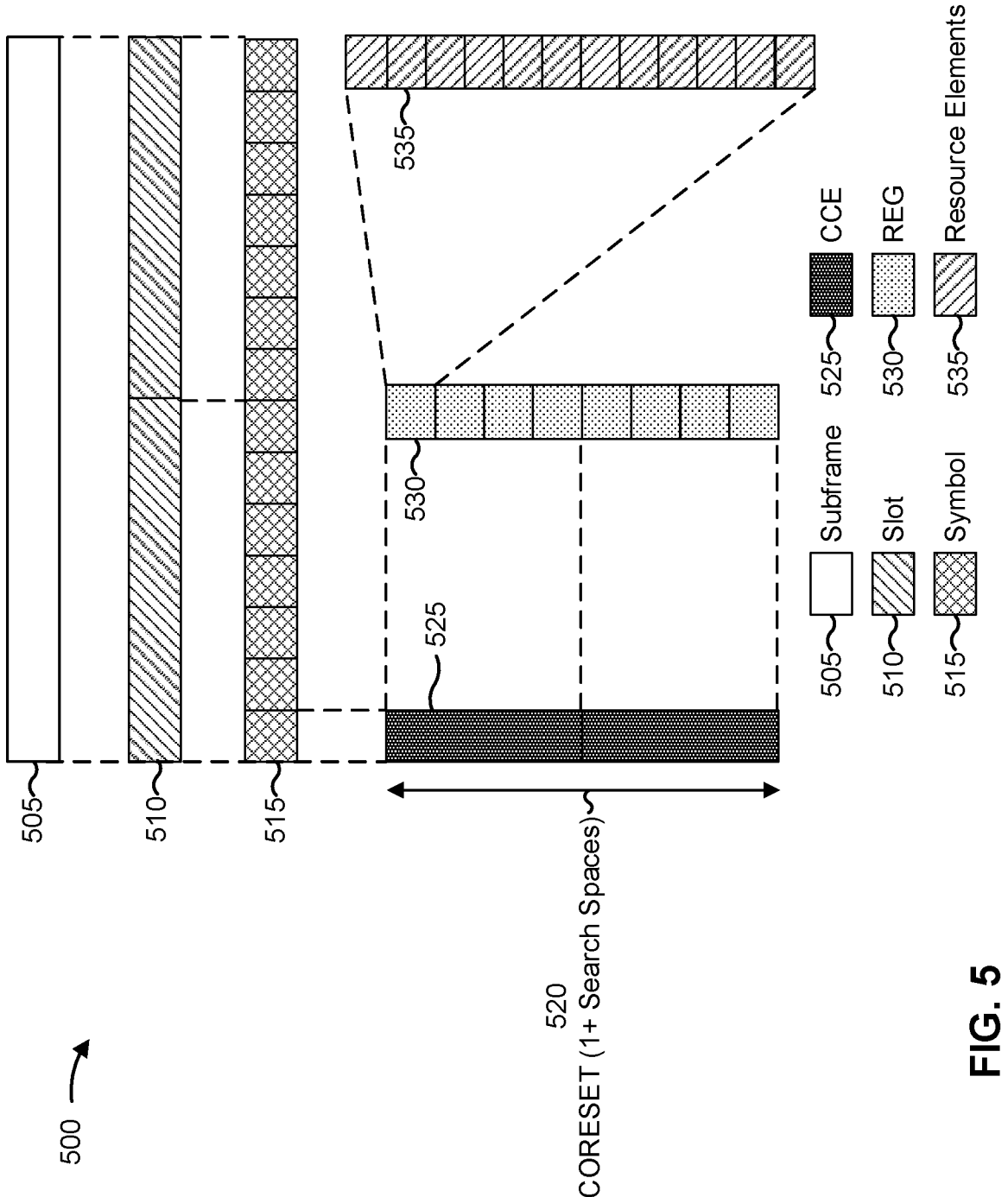
FIG. 5 is a diagram illustrating an example resource structure for wireless communication.

FIG. 5 is a diagram illustrating an example resource structure 500 for wireless communication, in accordance with various aspects of the present disclosure. Resource structure 500 shows an example of various groups of resources described herein. As shown, resource structure 500 may include a subframe 505. Subframe 505 may include multiple slots 510. While resource structure 500 is shown as including two (2) slots per subframe, a different number of slots may be included in a subframe (e.g., 4 slots, 8 slots, 16 slots, 32 slots, or the like). In some aspects, different types of transmission time intervals (TTIs) may be used, other than subframes and/or slots. A slot 510 may include multiple symbols 515, such as fourteen (14) symbols per slot.

The potential control region of a slot 510 may be referred to as a CORESET 520 and may be structured to support an efficient use of resources, such as by flexible configuration or reconfiguration of resources of the CORESET 520 for one or more PDCCHs, one or more PDSCHs, or the like. In some aspects, the CORESET 520 may occupy the first symbol 515 of a slot 510, the first two symbols 515 of a slot 510, or the first three symbols 515 of a slot 510. Thus, a CORESET 520 may include multiple resource blocks (RBs) in the frequency domain, and either one, two, or three symbols 515 in the time domain. In 5G, a quantity of resources included in the CORESET 520 may be flexibly configured, such as by using RRC signaling to indicate a frequency domain region (e.g., a quantity of resource blocks) and/or a time domain region (e.g., a quantity of symbols) for the CORESET 520.

As illustrated, a symbol 515 that includes CORESET 520 may include one or more control channel elements (CCEs) 525, shown as two CCEs 525 as an example, that span a portion of the system bandwidth. A CCE 525 may include DCI that is used to provide control information for wireless communication (e.g., to schedule a PDSCH transmission from a base station to a UE or a PUSCH transmission from a UE to a base station). A base station may transmit DCI during multiple CCEs 525 (as shown), where the quantity of CCEs 525 used for transmission of DCI represents the aggregation level (AL) used by the base station for the transmission of DCI. In FIG. 5, an aggregation level of two is shown as an example, corresponding to two CCEs 525 in a slot 510. In some aspects, different aggregation levels may be used, such as 1, 2, 4, 8, 16, or the like.

Each CCE 525 may include a fixed quantity of resource element groups (REGs) 530, shown as 6 REGs 530, or may include a variable quantity of REGs 530. In some aspects, the quantity of REGs 530 included in a CCE 525 may be specified by a REG bundle size. A REG 530 may include one resource block, which may include 12 resource elements (REs) 535 within a symbol 515. A resource element 535 may occupy one subcarrier in the frequency domain and one OFDM symbol in the time domain.

A search space may include all possible locations (e.g., in time and/or frequency) where a PDCCH may be located. A CORESET 520 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, or the like. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

A CORESET 520 may be interleaved or non-interleaved. An interleaved CORESET 520 may have a CCE-to-REG mapping such that adjacent CCEs are mapped to scattered REG bundles in the frequency domain (e.g., adjacent CCEs are not mapped to consecutive REG bundles of the CORESET 520). A non-interleaved CORESET 520 may have a CCE-to-REG mapping such that all CCEs are mapped to consecutive REG bundles (e.g., in the frequency domain) of the CORESET 520.

As indicated above, FIG. 5 is provided as an example. Other examples may differ from what is described with respect to FIG. 5.

Figure 6A:
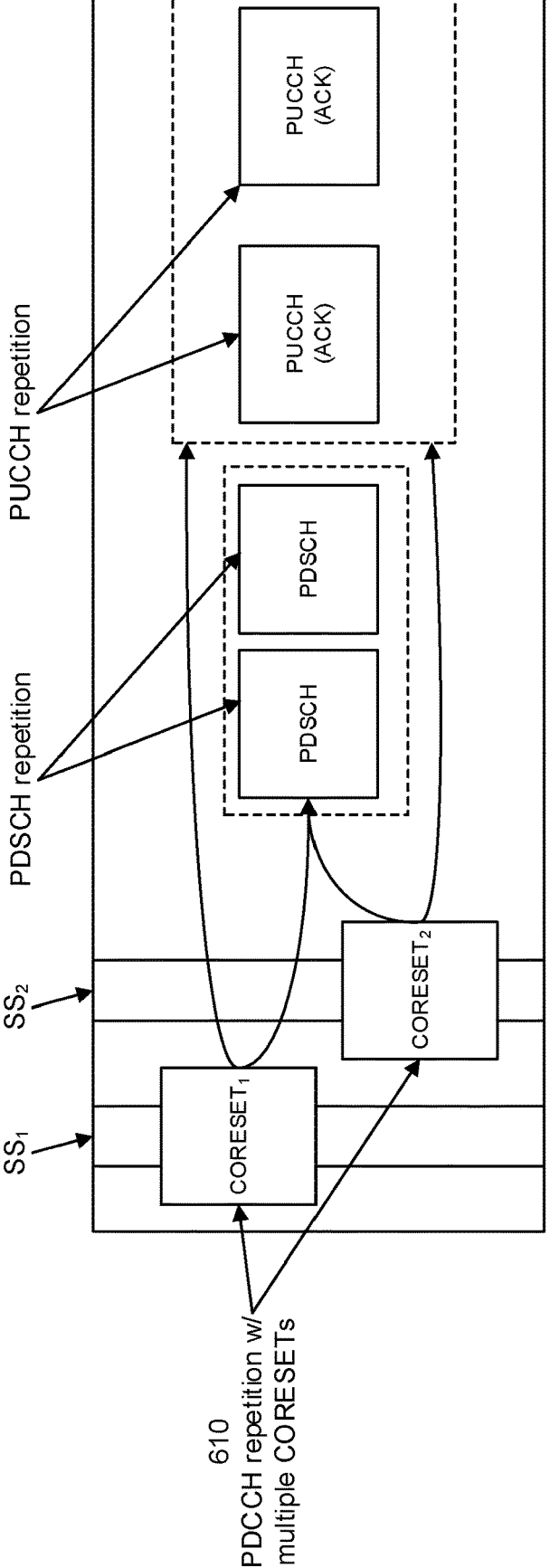
FIGS. 6A-6B are diagrams illustrating examples of downlink and uplink communications configured with multiple repetitions.
Figure 6B:
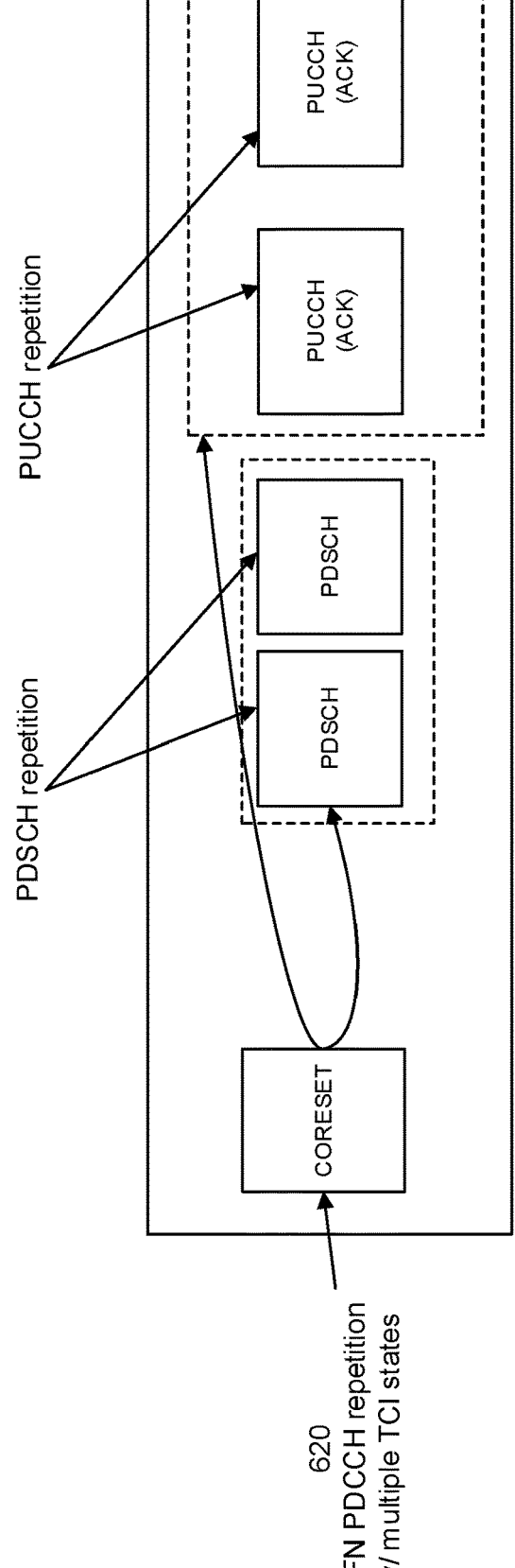

FIGS. 6A-6B are diagrams illustrating examples 600 of downlink and uplink communications configured with multiple repetitions. For example, as shown in FIGS. 6A-6B, one or more communications may be configured to be transmitted in multiple repetitions (e.g., the same transport block is transmitted multiple times) to increase reliability and/or robustness of the one or more communications.

For example, as shown in FIG. 6A, at 610, a base station may transmit, and a UE may receive, multiple repetitions of a PDCCH that carries DCI to schedule a PDSCH and indicate PUCCH resources to be used to transmit hybrid automatic repeat request (HARQ) feedback including an acknowledgement (ACK) or a negative acknowledgment (NACK) for the PDSCH. In the illustrated example, there may be a maximum of two (2) linked PDCCH candidates, whereby the PDCCH may be associated with a repetition configuration in which one DCI message is transmitted in two search spaces associated with two CORESETs. For example, as shown in FIG. 6A, the base station transmits a first CORESET (CORESET$_1$) in a first search space (SS$_1$) and transmits a second CORESET (CORESET$_2$) in a second search space (SS$_2$).

Alternatively, as shown in FIG. 6B, at 620, the base station may transmit the multiple PDCCH repetitions according to an SFN configuration. For example, when the PDCCH is associated with an SFN repetition configuration, the base station transmits the DCI message in one CORE-SET using multiple TCI states (e.g., using different downlink beams that are associated with different antenna panels and/or different TRPs, among other examples). Furthermore, in FIGS. 6A-6B, the PDSCH scheduled by the PDCCH and the PUCCH that includes the HARQ feedback for the PDSCH are transmitted with multiple repetitions to increase reliability and/or robustness of the PDSCH and the PUCCH. Furthermore, it will be appreciated that the same or similar PDCCH repetition techniques can be applied in cases where the multiple PDCCH repetitions carry DCI to schedule a PUSCH that may be associated with a single transmission occasion or multiple repetitions.

Accordingly, as described herein, a base station may transmit multiple repetitions of a PDCCH to improve reliability and/or robustness of the DCI carried in the PDCCH. For example, transmitting one DCI message multiple times using multiple CORESETs associated with different search spaces (e.g., in a non-SFN configuration) and/or multiple TCI states associated with a CORESET (e.g., in an SFN configuration) reduces a likelihood that an interruption to a PDCCH transmission on a particular link causes a communication to be dropped (e.g., due to an object or another obstruction physically blocking a transmission path for the particular link and/or due to other communications causing interference on the particular link). Furthermore, in some cases, the base station may vary one or more transmission parameters when transmitting different repetitions of a PDCCH. For example, in the non-SFN repetition configuration shown in FIG. 6A, the base station may transmit different PDCCH repetitions using different CORESETS associated with different search spaces and/or at different frequencies within the search spaces to avoid potential interference and/or blockages that may affect the different PDCCH repetitions on a particular frequency. Additionally, or alternatively, in the SFN repetition configuration shown in FIG. 6B, the base station may simultaneously transmit different PDCCH repetitions in a CORESET (e.g., using the same time and frequency resources) using different TCI states that are associated with different beam directions to avoid potential interference and/or blockages that may affect the different PDCCH repetitions in a particular beam direction. However, transmitting the PDCCH repetitions may create ambiguity in cases where the UE has to determine a default downlink or uplink beam to receive or transmit a data channel (e.g., a PDSCH or a PUSCH scheduled by the PDCCH) and/or a control channel (e.g., a PUCCH that includes UCI, such as HARQ feedback for a PDSCH scheduled by the PDCCH).

For example, when a UE connects to a wireless network, the UE may be configured with a default TCI state that indicates a default beam. In some cases, an RRC setting (e.g., a TCIPresentInDCI parameter) may be established after the UE has connected to the wireless network to enable or disable a DCI-based beam selection or beam indication (e.g., the RRC setting may indicate whether subsequent DCI messages will include a TCI field to indicate a TCI state for a PDSCH, a PUSCH, and/or a PUCCH). Accordingly, in cases where the RRC setting indicates that the DCI-based beam selection or beam indication is disabled (e.g., the TCIPresentinDCI parameter is set to disabled), the UE uses the default beam for any DCI scheduling future data transmissions. However, existing techniques to determine a default PDSCH, PUSCH, and/or PUCCH beam are generally limited to cases where the PDCCH is transmitted without repetitions. For example, in cases where a DCI scheduling a PDSCH is associated with a DCI format that does not have a TCI field to indicate the TCI state for the PDSCH, the default TCI state for the PDSCH is the TCI state associated with the CORESET for the DCI scheduling the PDSCH. Similarly, in cases where a DCI schedules a PUSCH transmission by a UE and the UE is not configured with PUCCH resources on an active uplink bandwidth part, the default uplink beam is determined according to a spatial relation that is based at least in part on a QCL assumption associated with a CORESET having a lowest identifier on an active downlink bandwidth part. Accordingly, in cases where a PDCCH is associated with a repetition configuration (e.g., one DCI is transmitted in multiple CORESETs that are associated with respective search spaces and/or one or more CORESETs that are associated with multiple TCI states), the UE may be unable to determine a default beam to use to receive a PDSCH and/or to transmit a PUSCH scheduled by the DCI because there may be multiple CORESETs and/or TCI states associated with the scheduling DCI.

Some aspects described herein relate to techniques and apparatuses to determine a default downlink beam or a default uplink beam in cases where a PDCCH is associated with a repetition configuration that includes multiple CORE-SETs and/or a CORESET associated with multiple TCI states. For example, in some aspects, the PDCCH may be associated with multiple CORESETs and may schedule a PDSCH without repetitions, in which case the UE may determine the default beam for the PDSCH based on a TCI state or a QCL assumption applied for one of the multiple CORESETs. In some aspects, in cases where the PDCCH includes a CORESET associated with multiple TCI states, the UE may determine the default beam for receiving a PDSCH without repetitions based on one of the TCI states associated with the CORESET. Alternatively, in cases where the PDCCH schedules a PDSCH with repetitions, the UE may map TCI states associated with different CORESETs and/or different TCI states associated with a CORESET to different sets of PDSCH reception occasions. Furthermore, when the PDCCH schedules a PUSCH and includes a CORESET associated with multiple TCI states, the UE may determine the default beam based on one of the TCI states associated with the CORESET in cases where the PUSCH is configured without repetitions or based on a mapping of the TCI states associated with the CORESET to different sets of PUSCH transmission occasions in cases where the PUSCH is configured with repetitions.

As indicated above, FIGS. 6A-6B are provided as examples. Other examples may differ from what is described with respect to FIGS. 6A-6B.

FIGS. 7A-7D are diagrams illustrating examples 700 associated with determining a default downlink beam for a downlink control channel with a repetition configuration. For example, as described herein with reference to FIGS. 7A-7D, the downlink control channel may be a PDCCH that a base station (e.g., base station 110) transmits to a UE (e.g., UE 120) to schedule a downlink data channel (e.g., a PDSCH). Furthermore, as described herein, the PDSCH may be scheduled by a DCI format in which a TCI field is not present (e.g., the PDCCH does not include a downlink beam indication), and a time offset between reception of the scheduling DCI and the PDSCH scheduled by the DCI may satisfy (e.g., equal or exceed) a threshold that defines a minimum number of symbols that the UE requires to perform PDCCH reception and apply spatial QCL information received in the scheduling DCI in order to properly receive and process the PDSCH.

Accordingly, as described in further detail herein, the examples 700 shown in FIGS. 7A-7D apply to one or more scenarios in which a PDCCH scheduling a PDSCH is transmitted according to a repetition configuration, the PDSCH is scheduled by a DCI format in which the TCI field is not present, and the UE has sufficient time to decode the scheduling DCI and to determine and apply spatial QCL information to properly receive and process the PDSCH (e.g., the time offset between the reception of the scheduling DCI and the PDSCH scheduled by the DCI equals or exceeds a threshold, which may be defined in a timeDurationForQCL parameter based on a reported UE capability.

Figure 7A:
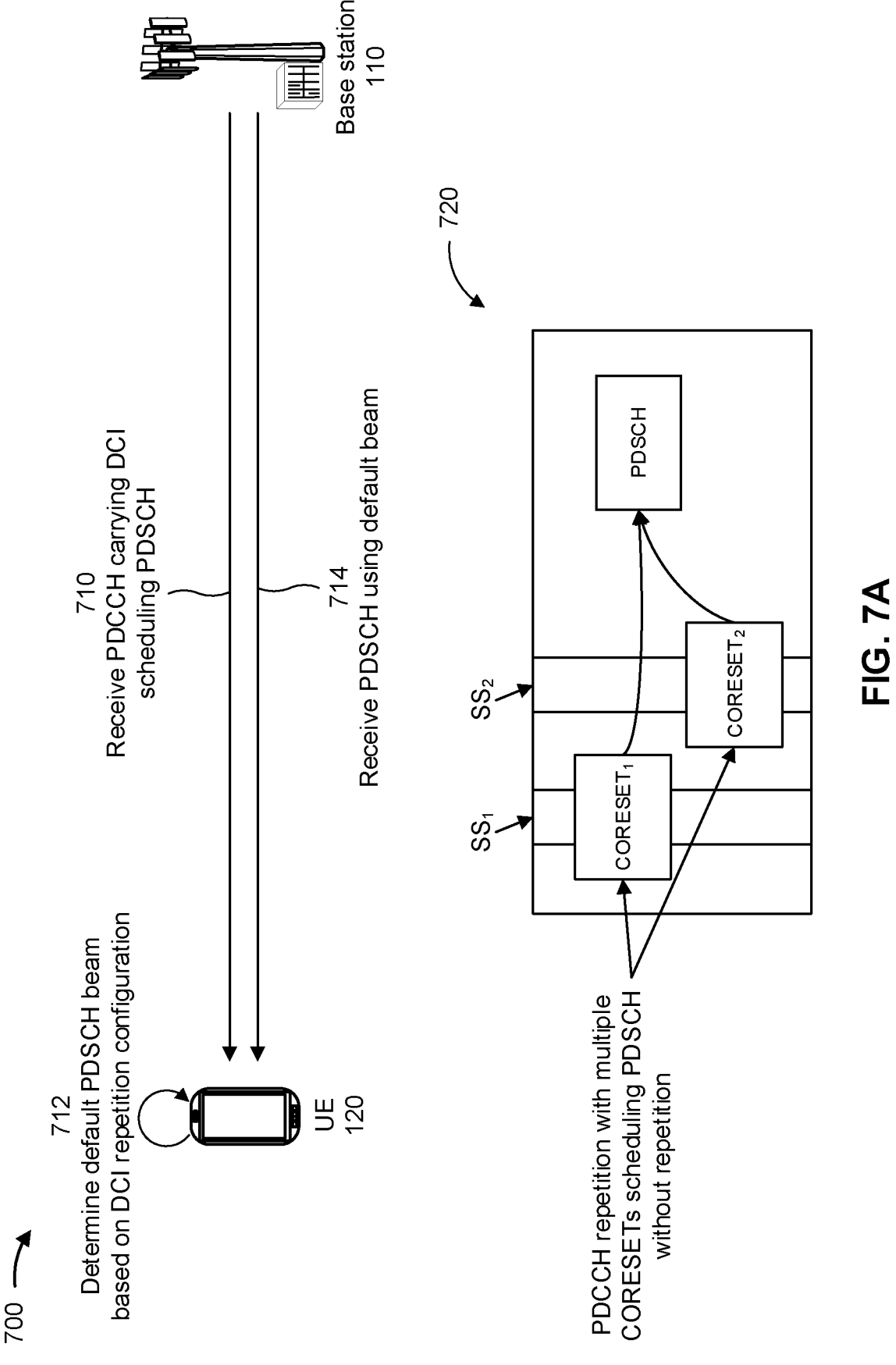
FIGS. 7A-7D are diagrams illustrating examples associated with determining a default downlink beam for a downlink control channel with a repetition configuration.
Figure 7B:
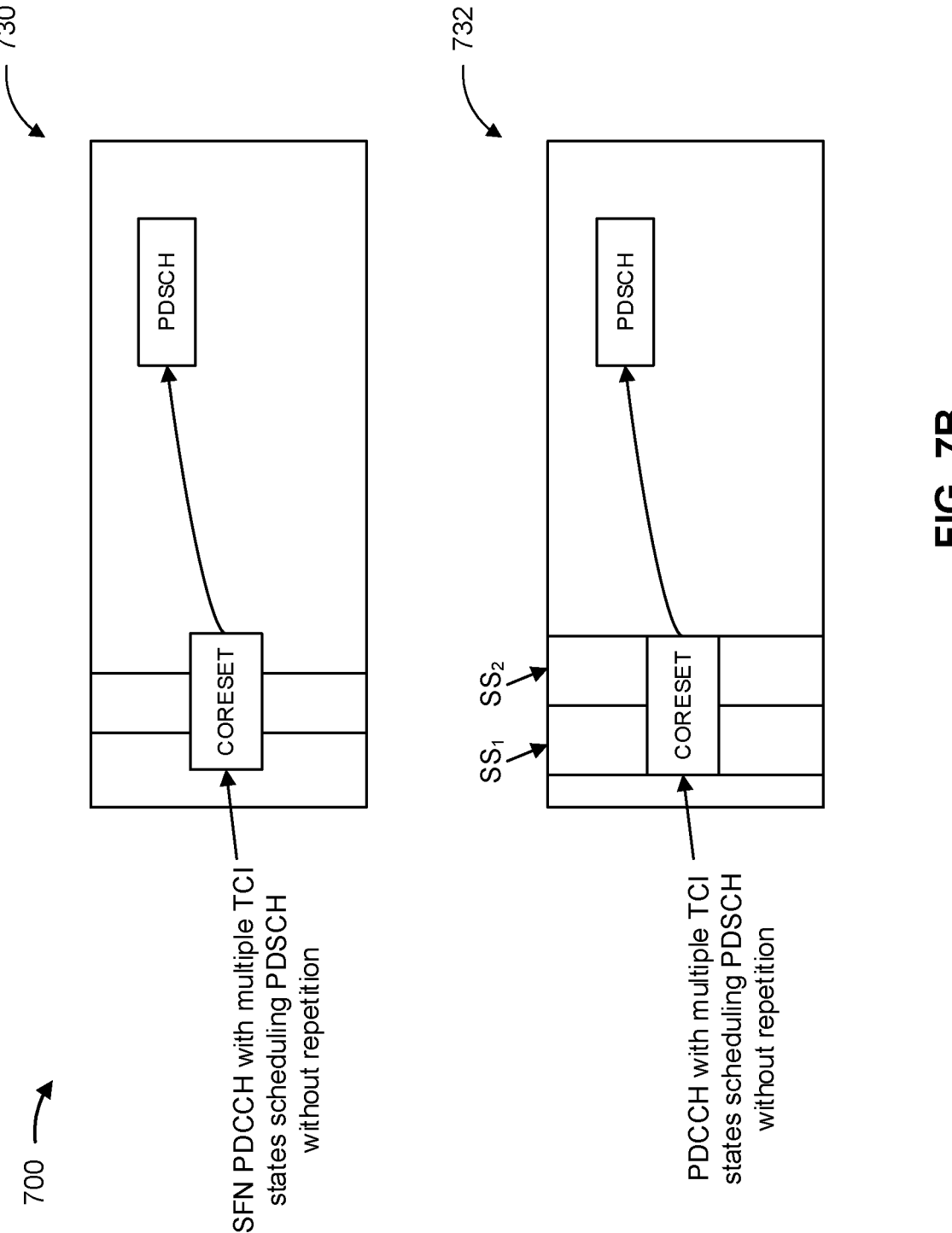
Figure 7C:
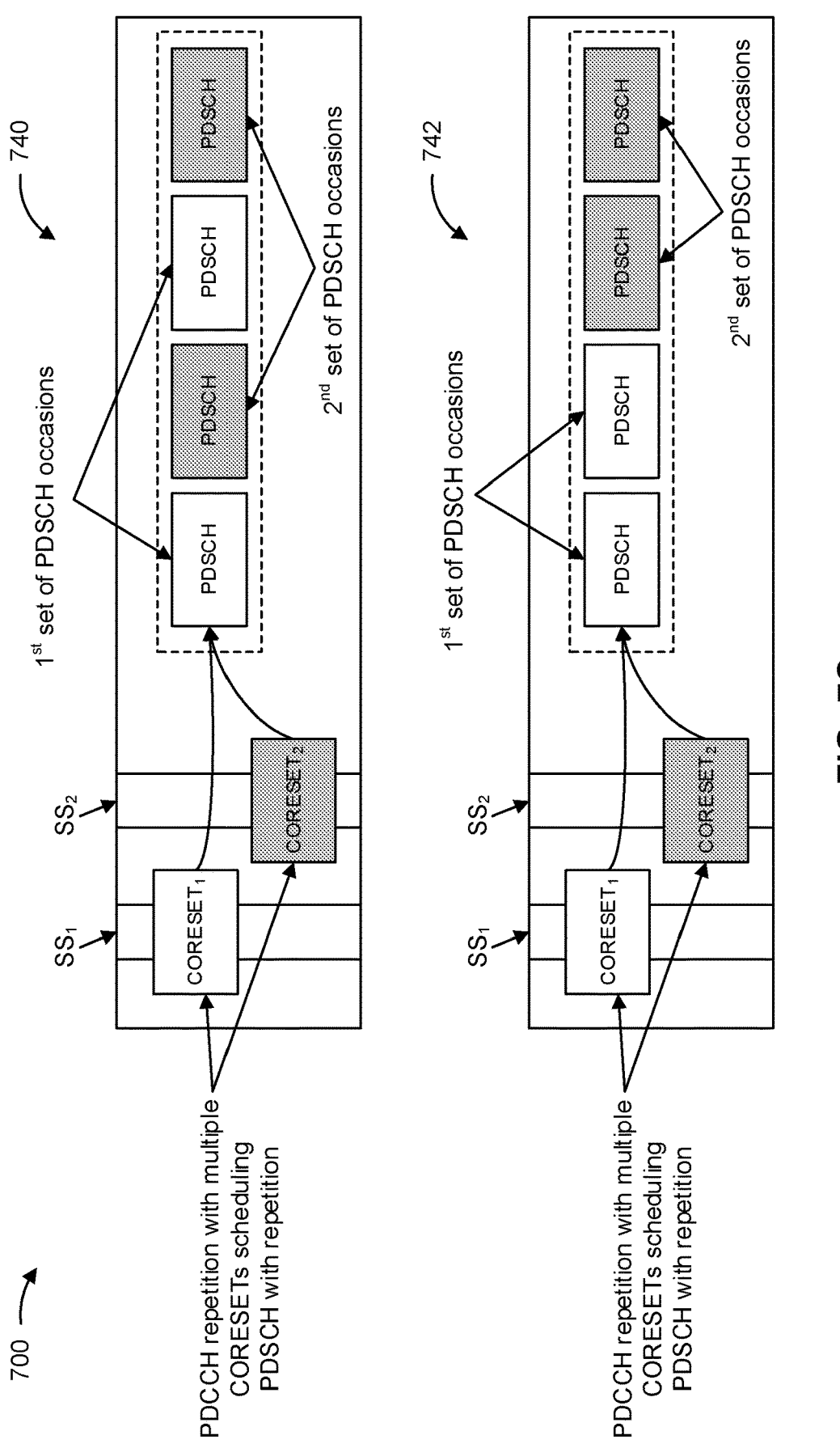
Figure 7D:
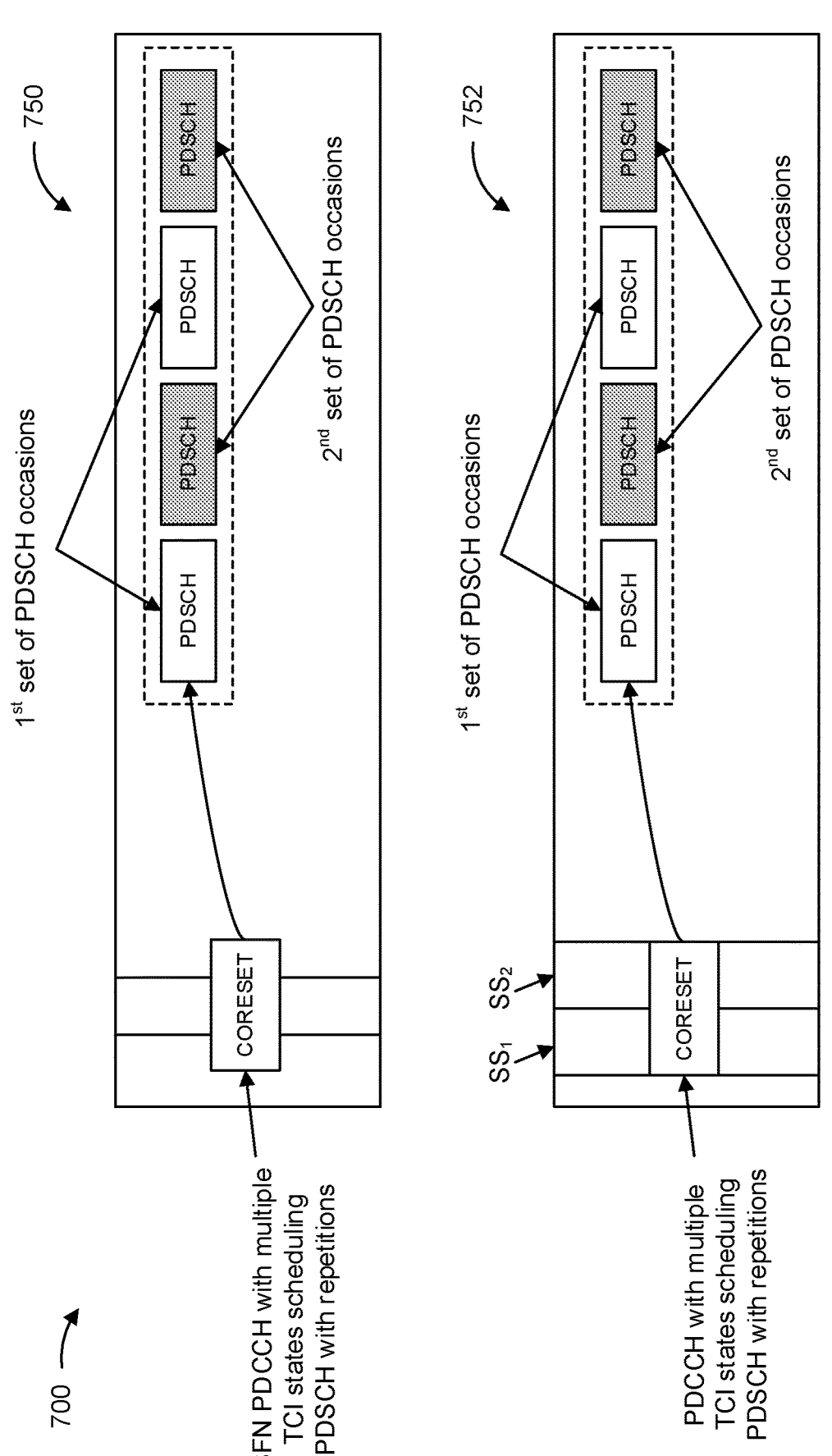

For example, as shown in FIG. 7A, at 710, the base station may transmit, and the UE may receive, a PDCCH that carries DCI to schedule a PDSCH associated with one or more reception occasions (e.g., the PDSCH may be configured without repetitions, as shown in FIGS. 7A-7B, or the PDSCH may be configured with repetitions, as shown in FIGS. 7C-7D). Furthermore, as described herein, the PDCCH is associated with a repetition configuration to increase reliability and/or robustness of the PDCCH. For example, as described herein with reference to FIGS. 7A and 7C, the PDCCH may be transmitted according to a non-SFN repetition configuration, where one DCI is transmitted in multiple CORESETs associated with multiple respective search spaces. Alternatively, as described herein with reference to FIGS. 7B and 7D, the PDCCH may be transmitted according to an SFN repetition configuration, where one DCI is transmitted in a CORESET associated with multiple TCI states (e.g., using different beams and the same time and frequency resources).

As further shown in FIG. 7A, at 712, the UE may determine a default downlink beam (e.g., a default PDSCH receive beam) according to the repetition configuration of the PDCCH based at least in part on determining that one or more conditions are satisfied. For example, the UE may determine the default downlink beam according to the repetition configuration of the PDCCH based at least in part on the DCI scheduling the PDSCH not having a TCI field present or otherwise lacking a beam indication for the PDSCH and the time offset between reception of the scheduling DCI and the corresponding PDSCH satisfying the threshold that defines the minimum number of symbols that the UE requires to perform PDCCH reception and apply spatial QCL information received in the scheduling DCI in order to properly receive and process the PDSCH (e.g., the time offset equals or exceeds a timeDurationForQCL parameter). In some aspects, based at least in part on determining that the one or more conditions are satisfied, the UE may apply one or more rules to determine the default downlink receive beam depending on whether the PDSCH is configured with or without repetitions and/or depending on whether the PDCCH is associated with multiple CORESETs associated with different search spaces or a CORESET associated with different TCI states. As shown at 714, the UE may then receive the PDSCH using the default downlink receive beam.

For example, as shown in FIG. 7A, at 720, the UE may determine the default downlink receive beam in a context where the PDCCH repetition configuration includes multiple CORESETs associated with different search spaces and the PDSCH is configured with a single reception occasion (e.g., the PDCCH is associated with a non-SFN configuration and the PDSCH is configured without repetitions). In this case, where the base station transmits the DCI scheduling the PDSCH in different CORESETs that are associated with different search spaces, and the scheduling DCI does not have a TCI field present, the UE may determine that the default downlink receive beam is associated with a TCI state or a QCL assumption associated with one of the multiple CORESETs in the PDCCH repetition configuration. For example, in some aspects, the default downlink receive beam may be associated with a TCI state or a QCL assumption that is identical to a TCI state or a QCL assumption applied for one of the multiple CORESETs having a lowest or highest CORESET identifier (ID), one of the multiple CORESETs having a lowest or highest CORESET pool identifier (ID), one of the multiple CORESETs that is associated with a search space having a lowest search space ID or a highest search space ID, one of the multiple CORESETs associated with a latest monitored search space or an earliest monitored search space. In cases where the PDSCH is associated with an SFN configuration, the UE may determine that the multiple default downlink receive beams are associated with respective TCI states of the multiple CORESETs.

Accordingly, as shown in FIG. 7A, at 720, if the PDSCH, not configured with any repetitions, is scheduled by a DCI format not having the TCI field present, and the time offset between the reception of the DL DCI and the corresponding PDSCH of a serving cell is equal to or greater than a threshold timeDurationForQCL, and if more than one CORESET is associated with the PDCCH transmissions of the downlink DCI within the active bandwidth part of the serving cell, the UE assumes that the TCI state or the QCL assumption for the PDSCH is identical to the TCI state or QCL assumption whichever is applied for the lowest (or highest) CORESET ID of the CORESETs associated with the PDCCH transmissions scheduling the PDSCH, the CORESET ID of the lowest (or highest) search space ID associated with the PDCCH transmissions scheduling the PDSCH, the CORESET ID of a latest (or earliest) monitored search space associated with the PDCCH transmissions scheduling the PDSCH. In cases where the PDSCH is associated with an SFN configuration, the UE may determine that the multiple default downlink receive beams are associated with respective TCI states of the multiple CORESETs associated with the PDCCH transmissions scheduling the PDSCH.

In another example, as shown in FIG. 7B, at 730 and 732, the UE may determine the default downlink receive beam in a context where the PDCCH repetition configuration includes a CORESET associated with multiple TCI states and the PDSCH is configured with a single reception occasion (e.g., the PDCCH is associated with an SFN configuration and the PDSCH is configured without repetitions). In this case, where the base station transmits the DCI scheduling the PDSCH in a CORESET using different beams that are associated with different TCI states, and the scheduling DCI does not have a TCI field present, the UE may determine that the default downlink receive beam is associated with a TCI state associated with one or more of the multiple TCI states. For example, when the PDCCH repetition configuration includes a CORESET associated with multiple TCI states and the PDSCH is configured without repetitions, the TCI state that the UE applies for the default downlink receive beam may correspond to a first (or second) TCI state of the multiple TCI states associated with the CORESET, one of the multiple TCI states associated with the CORESET that has a lowest (or highest) TCI ID, one of the multiple TCI states associated with the CORESET that is quasi co-located (QCLed) with an SSB having a lowest (or highest) index. In cases where the PDSCH is associated with an SFN configuration, the UE may determine that the multiple default downlink receive beams are associated with respective TCI states of the CORESET scheduling the PDSCH.

Accordingly, as shown in FIG. 7B, at 730 and 732, if the PDSCH, not configured with any repetitions, is scheduled by a DCI format not having the TCI field present, and the time offset between the reception of the DL DCI and the corresponding PDSCH of a serving cell is equal to or greater than a threshold timeDurationForQCL, the UE assumes that the TCI state or the QCL assumption for the PDSCH is identical to the TCI state or QCL assumption whichever is applied for the CORESET used for the PDCCH transmission within the active bandwidth part of the serving cell. If there are two TCI states associated with the CORESET, the TCI state to be applied is the first (or second) TCI ID of two TCI states associated with the CORESET for the PDCCH transmission, the lowest (or highest) TCI ID of two TCI states associated with the CORESET for the PDCCH transmission, the TCI ID of two TCI states associated with the CORESET for the PDCCH transmission QCLed with lowest (or highest) SSB index. In cases where the PDSCH is associated with an SFN configuration, the UE may determine that the multiple default downlink receive beams are associated with respective TCI states of the CORESET scheduling the PDSCH.

In another example, as shown in FIG. 7C, at 740 and 742, the UE may determine the default downlink receive beam in a context where the PDCCH repetition configuration includes multiple CORESETs associated with different search spaces and the PDSCH is configured with multiple reception occasions (e.g., the PDCCH is associated with a non-SFN configuration and the PDSCH is configured with repetitions). In this case, where the base station transmits the DCI scheduling a PDSCH with multiple repetitions in different CORESETs that are associated with different search spaces, and the scheduling DCI does not have a TCI field present, the UE may determine the default downlink receive beam for a first set of PDSCH reception occasions and a second set of PDSCH reception occasions. In other words, where there are multiple PDSCH reception occasions, the UE may apply different default downlink receive beams in different sets of PDSCH reception occasions. For example, in cases where one DCI is transmitted in two CORESETs associated with two search spaces, the UE may determine two default downlink receive beams to be applied in two respective sets of PDSCH occasions.

For example, as shown at 740, the multiple PDSCH occasions may be associated with a cyclic mapping, where a first default downlink receive beam is used in a first PDSCH reception occasion, a second default downlink receive beam is used in a second PDSCH reception occasion, and this cyclic pattern continues if there are additional PDSCH reception occasions. Alternatively, as shown at 742, the multiple PDSCH occasions may be associated with a sequential mapping, where a first default downlink receive beam is used in a first half of the PDSCH reception occasions and a second default downlink receive beam is used in a second half of the PDSCH reception occasions. It will be appreciated, however, that other suitable mappings may be used to determine the first set of PDSCH reception occasions and the second set of PDSCH reception occasions. For example, the first set of PDSCH reception occasions and the second set of PDSCH reception occasions may be determined according to a cyclic mapping (e.g., as shown at 740), a sequential mapping (e.g., as shown at 742), a DMRS code division multiplexing (CDM) group index, time allocation parts, frequency allocation parts, and/or other suitable information.

Accordingly, in cases where the DCI scheduling a PDSCH with multiple repetitions lacks a beam indication and is associated with a non-SFN repetition configuration (e.g., multiple CORESETs associated with different search spaces), the UE may determine that DMRS ports associated with the first set of PDSCH reception occasions are QCLed with one or more reference signals with respect to a QCL parameter that is used for a PDCCH QCL indication of one CORESET associated with a lowest CORESET ID among the CORESETs with the PDCCH transmissions scheduling the set of the PDSCH reception occasions, and the UE may further determine that DMRS ports associated with the second set of PDSCH reception occasions are QCLed with one or more reference signals with respect to a QCL parameter that is used for a PDCCH QCL indication of one CORESET associated with a highest CORESET ID among the CORESETs with the PDCCH transmissions scheduling the set of the PDSCH reception occasions. Additionally, or alternatively, the UE may determine that the DMRS ports for the first set of PDSCH reception occasions and the second set of PDSCH reception occasions are QCLed with one or more reference signals respectively associated with a first CORESET associated with a first search space having a lowest search space identifier and a second CORESET associated with a second search space having a highest search space identifier among the CORESETs with the PDCCH transmissions scheduling the set of the PDSCH reception occasions. Additionally, or alternatively, the UE may determine that the DMRS ports for the first set of PDSCH reception occasions and the second set of PDSCH reception occasions are QCLed with one or more reference signals respectively associated with a first CORESET associated with a first monitored search space that is latest in time and a second CORESET associated with a monitored search space that is earliest in time among the CORESETs with the PDCCH transmissions scheduling the set of the PDSCH reception occasions.

Accordingly, as shown in FIG. 7C, at 740 and 742, if the PDSCH, configured with any repetitions, is scheduled by a DCI format not having the TCI field present, and the time offset between the reception of the DL DCI and the corresponding PDSCH of a serving cell is equal to or greater than a threshold timeDurationForQCL, and if more than one CORESET is associated with the PDCCH transmissions of the downlink DCI within the active bandwidth part of the serving cell, the UE may assume that the DMRS ports of a first set of PDSCH occasions and a second set of PDSCH occasions are QCLed with the reference signal(s) with respect to the QCL parameter(s) used for PDCCH QCL indication of the CORESET respectively associated with the lowest and the highest CORESET ID of the CORESETs associated with the PDCCH transmission, the CORESET ID of the lowest and the highest search space ID associated with the PDCCH transmission, or the CORESET ID of the latest and the earliest monitored search space associated with the PDCCH transmission, where the first set of PDSCH occasions and the second set of PDSCH occasions can be determined by transmission time occasions in a cyclic or sequential mapping, a DMRS CDM group index, time allocation parts or frequency allocation parts.

In another example, as shown in FIG. 7D, at 750 and 752, the UE may determine the default downlink receive beam in a context where the PDCCH repetition configuration includes a CORESET associated with multiple TCI states and the PDSCH is configured with multiple reception occasions (e.g., the PDCCH is associated with an SFN repetition configuration and the PDSCH is configured with repetitions). In this case, the base station may transmit the DCI scheduling the PDSCH in a CORESET associated with one search space, as shown at 750, or the base station may transmit the DCI scheduling the PDSCH in a CORESET associated with multiple search space, as shown at 752. In either case, where the scheduling DCI does not have a TCI field present and the time offset between reception of the scheduling DCI and the scheduled PDSCH satisfies a threshold, the UE may determine the default downlink receive beam for a first set of PDSCH reception occasions and a second set of PDSCH reception occasions based on the SFN repetition configuration of the PDCCH. In other words, where there are multiple PDSCH reception occasions, the UE may apply different default downlink receive beams in different sets of PDSCH reception occasions, which may be determined based on a cyclic mapping, a sequential mapping, a DMRS CDM group index, frequency allocation parts, and/or other suitable information.

Accordingly, in cases where the DCI scheduling a PDSCH with multiple repetitions lacks a beam indication and is associated with a PDCCH repetition configuration in which one CORESET is associated with multiple TCI states, the UE may determine that DMRS ports associated with the first set of PDSCH reception occasions are QCLed with one or more reference signals with respect to a QCL parameter that is used for a PDCCH QCL indication of a first TCI state associated with the CORESET, and the UE may further determine that DMRS ports associated with the second set of PDSCH reception occasions are QCLed with one or more reference signals with respect to a QCL parameter that is used for a PDCCH QCL indication of a second TCI state associated with the CORESET. Additionally, or alternatively, the UE may determine that the DMRS ports for the first set of PDSCH reception occasions and the second set of PDSCH reception occasions are QCLed with one or more reference signals respectively associated with a first TCI state associated with a lowest TCI identifier and a second TCI state associated with a highest TCI identifier. Additionally, or alternatively, the UE may determine that the DMRS ports for the first set of PDSCH reception occasions and the second set of PDSCH reception occasions are QCLed with one or more reference signals respectively associated with a first TCI state that is QCLed with an SSB having a lowest index and a second TCI state that is QCLed with an SSB having a highest index.

Accordingly, as shown in FIG. 7D, at 750 and 752, if the PDSCH, configured with any repetitions, is scheduled by a DCI format not having the TCI field present, and the time offset between the reception of the DL DCI and the corresponding PDSCH of a serving cell is equal to or greater than a threshold timeDurationForQCL, and if more than one CORESET is associated with the PDCCH transmissions of the downlink DCI within the active bandwidth part of the serving cell, the UE may assume that the DMRS ports of the first set of PDSCH occasions and the second set of PDSCH occasions are QCLed with the reference signal(s) with respect to the QCL parameter(s) used for PDCCH QCL indication of the CORESET respectively associated with the first and second TCI ID of two TCI states associated with the CORESET for the PDCCH transmission, the lowest and highest TCI ID of two TCI states associated with the CORESET for the PDCCH transmission, or the TCI ID of two TCI states associated with the CORESET for the PDCCH transmission QCLed with lowest and highest SSB index.

As indicated above, FIGS. 7A-7D are provided as examples. Other examples may differ from what is described with respect to FIGS. 7A-7D.

Figure 8A:
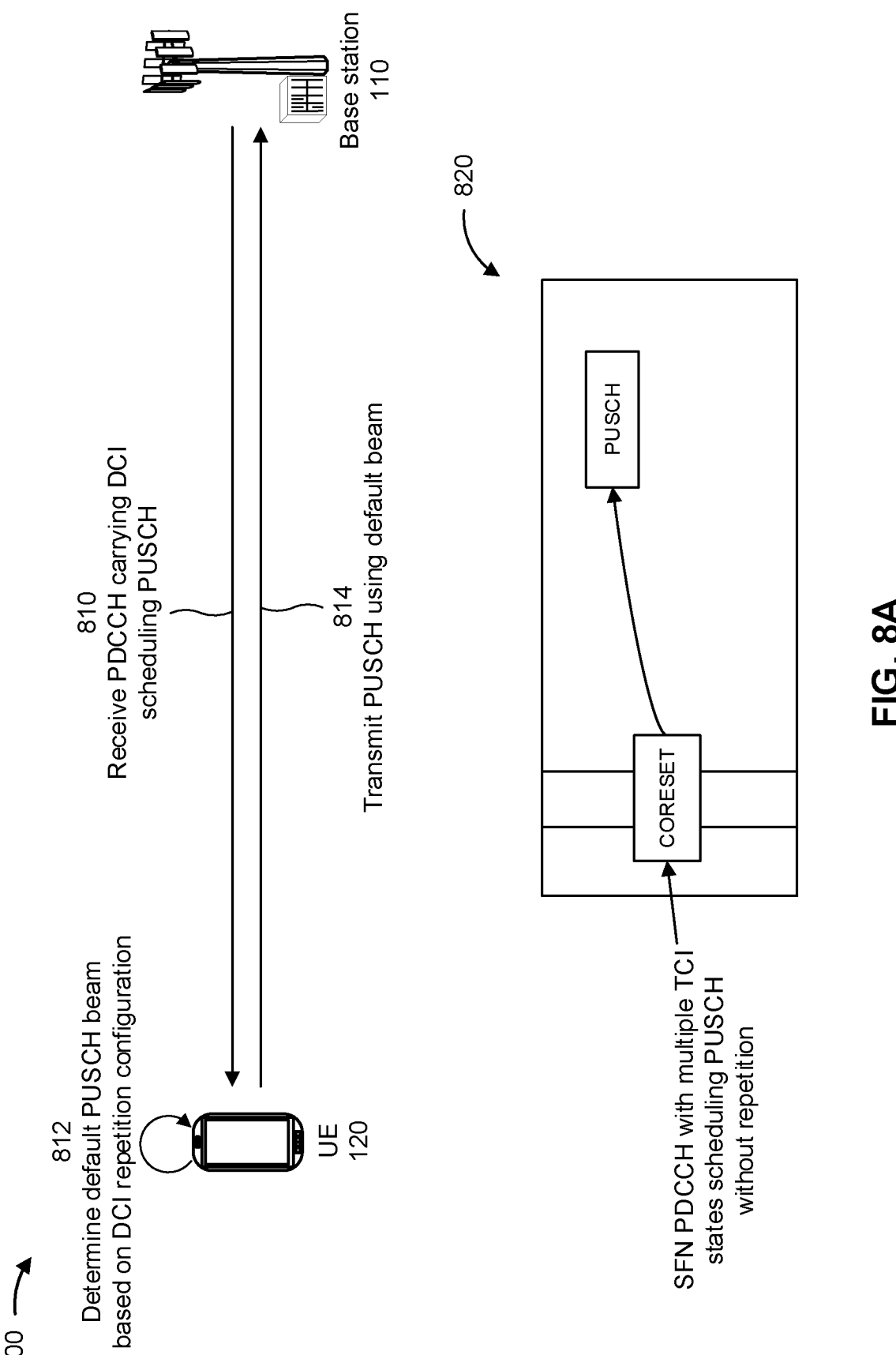
FIGS. 8A-8B are diagrams illustrating examples associated with determining a default uplink beam for a downlink control channel with a repetition configuration.
Figure 8B:
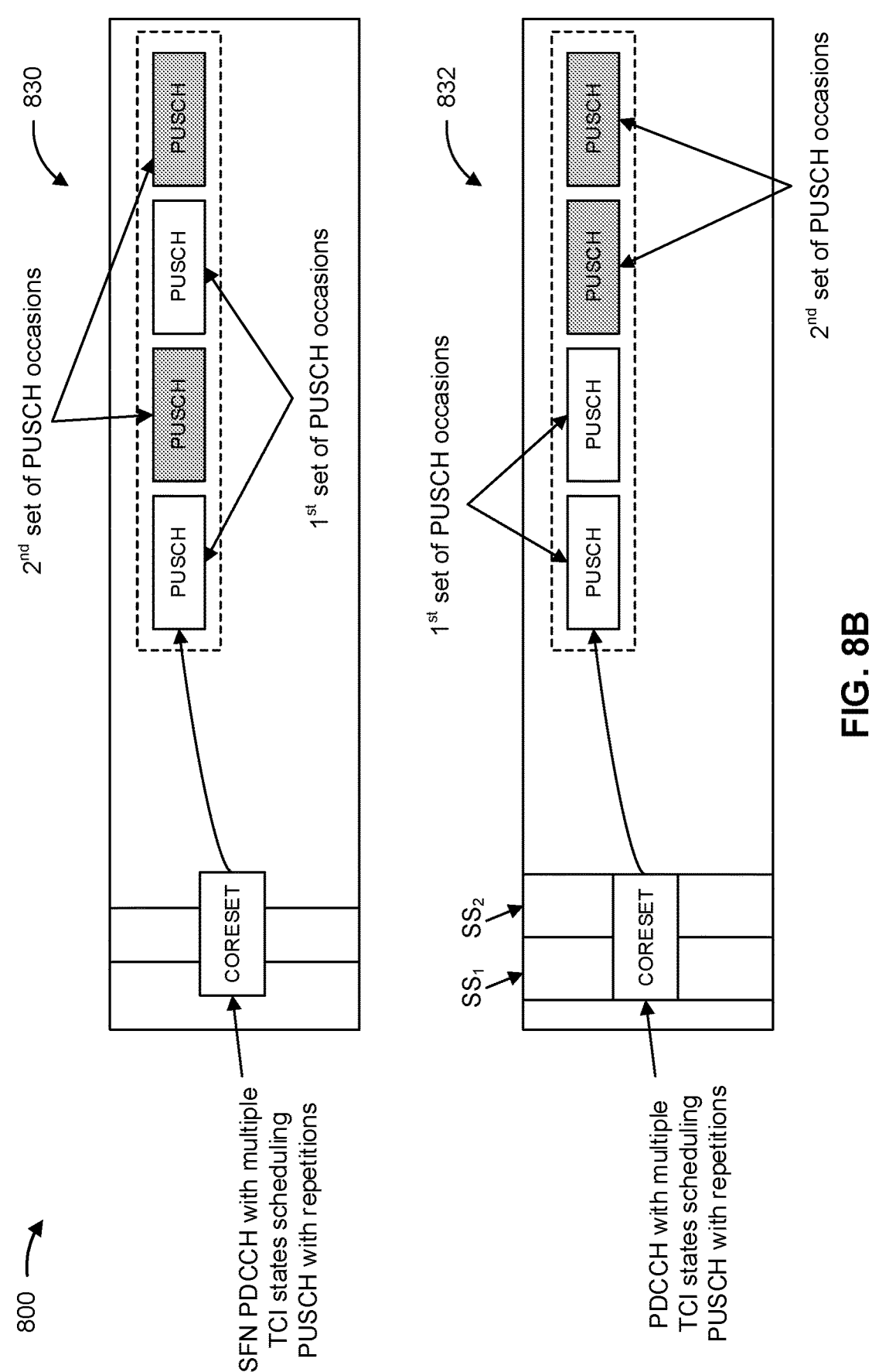

FIGS. 8A-8B are diagrams illustrating examples 800 associated with determining a default uplink beam for a downlink control channel with a repetition configuration. For example, as described herein with reference to FIGS. 8A-8B, the downlink control channel may be a PDCCH that a base station (e.g., base station 110) transmits to a UE (e.g., UE 120) to schedule an uplink data channel (e.g., a PUSCH). Furthermore, as described herein, the PUSCH is scheduled by DCI carried in the PDCCH, and the PUSCH is not associated with any uplink TCI state or spatial relation (e.g., the PUSCH is not associated with an uplink beam selection or beam indication). Accordingly, as described in further detail herein, the examples 800 shown in FIGS. 8A-8B apply to one or more scenarios in which a PDCCH scheduling a PUSCH is transmitted according to a repetition configuration, the PUSCH is not associated with an uplink TCI state or any spatial relation, and a higher-layer parameter for determining a default uplink transmit beam (e.g., enableDefaultBeamPL-ForPUSCH0-r16) is enabled.

For example, as shown in FIG. 8A, at 810, the base station may transmit, and the UE may receive, a PDCCH that carries DCI to schedule a PUSCH associated with one or more reception occasions (e.g., the PUSCH may be configured without repetitions, as shown in FIG. 8A, or the PUSCH may be configured with repetitions, as shown in FIG. 8B). Furthermore, as described herein, the PDCCH is associated with a repetition configuration to increase reliability and/or robustness of the PDCCH. For example, as described herein with reference to FIGS. 8A and 8B, the PDCCH may be transmitted according to an SFN repetition configuration, where one DCI is transmitted in a CORESET associated with multiple TCI states (e.g., using different beams and the same time and frequency resources).

As further shown in FIG. 8A, at 812, the UE may determine a default uplink beam (e.g., a default PUSCH transmit beam) according to the repetition configuration of the PDCCH based at least in part on determining that one or more conditions are satisfied. For example, the UE may determine the default uplink beam according to the repetition configuration of the PDCCH based at least in part on the base station enabling the higher-layer parameter for determining the default uplink beam in cases where the PUSCH is not associated with any uplink TCI state or spatial relation. In some aspects, based at least in part on determining that the one or more conditions are satisfied, the UE may apply one or more rules to determine the default uplink transmit beam based on the repetition configuration of the PDCCH depending on whether the PUSCH is configured with or without repetitions. For example, the one or more rules may generally be applicable in cases where the PDCCH is associated with an PDCCH repetition configuration, which includes a CORESET associated with multiple TCI states. Accordingly, in some aspects, the UE may determine the default uplink beam according to one or more parameters associated with the multiple TCI states. As shown at 814, the UE may then transmit the PUSCH using the default uplink transmit beam.

For example, as shown in FIG. 8A, at 820, the UE may determine the default uplink transmit beam in a context where the PDCCH repetition configuration includes a CORESET associated with multiple TCI states and the PUSCH is configured with a single reception occasion (e.g., the PDCCH is associated with an SFN configuration and the PUSCH is configured without repetitions). In this case, where the base station transmits the DCI scheduling the PDSCH in a CORESET using different beams that are associated with different TCI states, the UE may determine that the default uplink transmit beam is associated with a TCI state associated with one or more of the multiple TCI states. For example, when the PDCCH repetition configuration includes a CORESET associated with multiple TCI states and the PUSCH is configured without repetitions, the TCI state that the UE applies for the default uplink transmit beam may correspond to a first TCI state of the multiple TCI states associated with the CORESET, one of the multiple TCI states associated with the CORESET that has a lowest TCI ID, or one of the multiple TCI states associated with the CORESET that is QCLed with an SSB having a lowest index.

Accordingly, as shown in FIG. 8A, at 820, for a PUSCH scheduled by a DCI format on a cell and if a higher layer parameter for a default beam (e.g., enableDefaultBeamPL-ForPUSCH0-r16) is set to 'enabled', the UE may transmit the PUSCH, if not applicable with any uplink TCI state or any spatial relation (e.g., to an uplink resource such as a PUCCH or an SRS resource), with a reference to the reference signal with 'QCL-TypeD' corresponding to the QCL assumption of the CORESET with the lowest ID on the active downlink bandwidth part of the cell. If the CORESET is configured with two TCI states, the applicable TCI state is the one with the first (or the second) TCI ID of two TCI states associated with the CORESET for the PDCCH transmission, the lowest (or highest) TCI ID of two TCI states associated with the CORESET for the PDCCH transmission, or the TCI ID of two TCI states associated with the CORE-SET for the PDCCH transmission QCLed with lowest (or highest) SSB index.

In another example, as shown in FIG. 8B, at 830 and 832, the UE may determine the default uplink transmit beam in a context where the PDCCH repetition configuration includes a CORESET associated with multiple TCI states and the PUSCH is configured with multiple reception occasions (e.g., the PDCCH is associated with an SFN repetition configuration and the PUSCH is configured with repetitions). In this case, the base station may transmit the DCI scheduling the PDSCH in a CORESET associated with one search space, as shown at 830, or the base station may transmit the DCI scheduling the PDSCH in a CORESET associated with multiple search spaces, as shown at 832. In either case, where the PUSCH is not associated with an uplink TCI state or a spatial relation, the UE may determine the default uplink transmit beam for a first set of PUSCH transmission occasions and a second set of PUSCH transmission occasions based on the SFN repetition configuration of the PDCCH. In other words, where there are multiple PUSCH transmission occasions, the UE may apply different default uplink transmit beams in different sets of PUSCH transmission occasions. For example, in cases where one DCI is transmitted using two beams (e.g., using different TCI states associated with a CORESET), the UE may determine two default uplink transmit beams to be applied in two respective sets of PUSCH occasions.

For example, as shown at 830, the multiple PUSCH occasions may be associated with a cyclic mapping, where a first default uplink transmit beam is used in a first PUSCH transmission occasion, a second default uplink transmit beam is used in a second PUSCH transmission occasion, and this cyclic pattern continues if there are additional PUSCH transmission occasions. Alternatively, as shown at 832, the multiple PUSCH occasions may be associated with a sequential mapping, where a first default uplink transmit beam is used in a first half of the PUSCH transmission occasions and a second default uplink transmit beam is used in a second half of the PUSCH transmission occasions. It will be appreciated, however, that other suitable mappings may be used to determine the first set of PUSCH transmission occasions and the second set of PUSCH transmission occasions. For example, the first set of PUSCH transmission occasions and the second set of PUSCH transmission occasions may be determined according to a cyclic mapping (e.g., as shown at 830), a sequential mapping (e.g., as shown at 832), a DMRS CDM group index, frequency allocation parts, and/or other suitable information.

Accordingly, in cases where a PUSCH scheduled with multiple repetitions lacks a beam indication and a PDCCH scheduling the PUSCH is associated with an SFN repetition configuration (e.g., one CORESET associated with multiple TCI states), the UE may determine that DMRS ports associated with the first set of PDSCH reception occasions are QCLed with one or more reference signals with respect to a QCL parameter that is used for a PDCCH QCL indication of a first TCI state associated with the CORESET, and the UE may further determine that a first TCI state to be applied in the first set of PUSCH transmission occasions and a second TCI state to be applied in the second set of PUSCH transmission occasions respectively correspond to a first TCI state and a second TCI state associated with the CORESET. Additionally, or alternatively, the first TCI state to be applied in the first set of PUSCH transmission occasions and the second TCI state to be applied in the second set of PUSCH transmission occasions may respectively correspond to a first TCI state associated with a lowest TCI identifier and a second TCI state associated with a highest TCI identifier.

Accordingly, as shown in FIG. 8B, at 830 and 832, for a PUSCH scheduled by a DCI format on a cell and if a higher layer parameter for a default beam (e.g., enableDefault-BeamPL-ForPUSCH0-r16) is set to 'enabled', the UE may transmit the PUSCH, if not applicable with any uplink TCI state or any spatial relation (e.g., to an uplink resource such as a PUCCH or an SRS resource), with a reference to the reference signal with 'QCL-TypeD' corresponding to the QCL assumption of the CORESET with the lowest ID on the active downlink bandwidth part of the cell. If the CORESET is configured with two TCI states, and the PUSCH transmission has a first set and a second set of transmission occasions (e.g., a cyclic mapping or a sequential mapping), the applicable TCI state associated with the first set and the second set of transmission occasions are respectively the first and second TCI ID of two TCI states associated with the CORESET and/or the lower and the higher TCI ID with the CORESET. The first set of PUSCH occasions and the second set of PUSCH occasions can be determined by transmission time occasions in a cyclic mapping, a sequential mapping, a DMRS CDM group index, or frequency allocation parts.

As indicated above, FIGS. 8A-8B are provided as examples. Other examples may differ from what is described with respect to FIGS. 8A-8B.

FIG. 9 is a flowchart of an example method 900 of wireless communication. The method 900 may be performed by, for example, a UE (e.g., UE 120).

At 910, the UE may receive, from a base station, DCI scheduling a downlink data channel, wherein the DCI is associated with a repetition configuration including one or more of multiple CORESETs or multiple TCI states associated with a CORESET. For example, the UE (e.g., using reception component 1102, depicted in FIG. 11) may receive, from a base station, DCI scheduling a downlink data channel, wherein the DCI is associated with a repetition configuration including one or more of multiple CORESETs or multiple TCI states associated with a CORESET, as described above in connection with, for example, FIGS. 7A-7D at 710, 720, 730, 732, 740, 742, 750, and 752. In some aspects, the downlink data channel is associated with a single reception occasion, and the repetition configuration associated with the DCI includes the multiple CORESETs, as described above in connection with, for example, FIG. 7A. In some aspects, the downlink data channel is associated with a single reception occasion, and the repetition configuration associated with the DCI includes the CORESET associated with the multiple TCI states, as described above in connection with, for example, FIG. 7B. In some aspects, the downlink data channel is configured with multiple reception occasions, and the repetition configuration associated with the DCI includes the multiple CORESETs, as described above in connection with, for example, FIG. 7C. In some aspects, the downlink data channel is configured with multiple reception occasions, and the repetition configuration associated with the DCI includes the CORESET associated with the multiple TCI states, as described above in connection with, for example, FIG. 7D.

At 920, the UE may determine a default beam for the downlink data channel based at least in part on the repetition configuration associated with the DCI, wherein the default beam is determined based at least in part on the multiple CORESETs or the multiple TCI states associated with the CORESET. For example, the UE (e.g., using determination component 1108, depicted in FIG. 11) may determine a default beam for the downlink data channel based at least in part on the repetition configuration associated with the DCI, wherein the default beam is determined based at least in part on the multiple CORESETs or the multiple TCI states associated with the CORESET, as described above in connection with, for example, FIGS. 7A-7D at 712, 720, 730, 732, 740, 742, 750, and 752.

In some aspects, as described above in connection with, for example, FIG. 7A, the default beam is associated with a TCI state or a QCL assumption applied for one of the multiple CORESETs having a lowest CORESET identifier. In some aspects, the default beam is associated with a TCI state or a QCL assumption applied for one of the multiple CORESETs associated with a search space having a lowest search space identifier or one of the multiple CORESETs associated with a search space having a highest search space identifier. In some aspects, the default beam is associated with a TCI state or a QCL assumption applied for one of the multiple CORESETs associated with a monitored search space that is latest in time or one of the multiple CORESETs associated with a monitored search space that is earliest in time. In some aspects, the default beam is associated with a first TCI state and a second TCI state that are respectively associated with a first CORESET and a second CORESET, of the multiple CORESETs, based at least in part on the downlink data channel having an SFN configuration.

In some aspects, as described above in connection with, for example, FIG. 7B, the default beam is associated with a first TCI state, of the multiple TCI states associated with the CORESET. In some aspects, the default beam is associated with a lowest TCI identifier, of TCI identifiers associated with the multiple TCI states associated with the CORESET. In some aspects, the default beam is associated with a TCI identifier, of TCI identifiers associated with the multiple TCI states associated with the CORESET, that is QCLed with an SSB having a lowest index. In some aspects, the default beam is associated with a first TCI state and a second TCI state, of the multiple TCI states associated with the CORE-SET, based at least in part on the downlink data channel having an SFN configuration.

In some aspects, as described above in connection with, for example, FIG. 7C, the multiple reception occasions include a first set of reception occasions in which the default beam is associated with one of the multiple CORESETs having a lowest CORESET identifier, and a second set of reception occasions in which the default beam is associated with one of the multiple CORESETs having a highest CORESET identifier. In some aspects, the multiple reception occasions include a first set of reception occasions in which the default beam is associated with one of the multiple CORESETs associated with a search space having a lowest search space identifier, and a second set of reception occasions in which the default beam is associated with one of the multiple CORESETs associated with a search space having a highest search space identifier. In some aspects, the multiple reception occasions include a first set of reception occasions in which the default beam is associated with one of the multiple CORESETs associated with a monitored search space that is latest in time, and a second set of reception occasions in which the default beam is associated with one of the multiple CORESETs associated with a monitored search space that is earliest in time. In some aspects, the multiple reception occasions include at least a first set of reception occasions and a second set of reception occasions associated with a cyclic mapping, a sequential mapping, a DMRS CDM group index, or frequency allocation parts.

In some aspects, as described above in connection with, for example, FIG. 7D, the multiple reception occasions include a first set of reception occasions in which the default beam is associated with a first TCI state, of the multiple TCI states associated with the CORESET, and a second set of reception occasions in which the default beam is associated with a second TCI state, of the multiple TCI states associated with the CORESET. In some aspects, the multiple reception occasions include a first set of reception occasions in which the default beam is associated with a lowest TCI identifier, of TCI identifiers associated with the multiple TCI states associated with the CORESET, and a second set of reception occasions in which the default beam is associated with a highest TCI identifier, of the TCI identifiers associated with the multiple TCI states associated with the CORESET. In some aspects, the multiple reception occasions include a first set of reception occasions in which the default beam is associated with a first TCI identifier, of TCI identifiers associated with the multiple TCI states associated with the CORESET, that is QCLed with an SSB having a lowest index, and a second set of reception occasions in which the default beam is associated with a second TCI identifier, of the TCI identifiers associated with the multiple TCI states associated with the CORESET, that is QCLed with an SSB having a highest index.

At 930, the UE may receive the downlink data channel using the default beam. For example, the UE (e.g., using reception component 1102, depicted in FIG. 11) may receive the downlink data channel using the default beam, as described above in connection with, for example, FIGS. 7A-7D at 714, 720, 730, 732, 740, 742, 750, and 752.

Although FIG. 9 shows example blocks of method 900, in some aspects, method 900 may include additional blocks, fewer blocks, different blocks, or differently arranged blocks than those depicted in FIG. 9. Additionally, or alternatively, two or more of the blocks of method 900 may be performed in parallel.

FIG. 10 is a flowchart of an example method 1000 of wireless communication. The method 1000 may be performed by, for example, a UE (e.g., UE 120).

At 1010, the UE may receive, from a base station, DCI scheduling an uplink data channel, wherein the DCI is associated with a repetition configuration including a CORESET associated with multiple TCI states. For example, the UE (e.g., using reception component 1302, depicted in FIG. 13) may receive, from a base station, DCI scheduling an uplink data channel, wherein the DCI is associated with a repetition configuration including a CORESET associated with multiple TCI states, as described above in connection with, for example, FIGS. 8A-8B at 810, 820, 830, and 832. In some aspects, the uplink data channel is associated with a single transmission occasion, as described above in connection with, for example, FIG. 8A. In some aspects, the uplink data channel is configured with multiple transmission occasions, as described above in connection with, for example, FIG. 8B.

At 1020, the UE may determine a default beam for the uplink data channel based at least in part on the repetition configuration associated with the DCI, wherein the default beam is determined based at least in part on the multiple TCI states associated with the CORESET. For example, the UE (e.g., using determination component 1308, depicted in FIG. 13) may determine a default beam for the uplink data channel based at least in part on the repetition configuration associated with the DCI, wherein the default beam is determined based at least in part on the multiple TCI states associated with the CORESET, as described above in connection with, for example, FIGS. 8A-8B at 812, 820, 830, and 832.

In some aspects, as described above in connection with, for example, FIG. 8A, the default beam is associated with a first TCI state, of the multiple TCI states associated with the CORESET. In some aspects, the default beam is associated with a lowest TCI identifier, of TCI identifiers associated with the multiple TCI states associated with the CORESET. In some aspects, the default beam is associated with a TCI identifier, of TCI identifiers associated with the multiple TCI states associated with the CORESET, that is QCLed with an SSB having a lowest index.

In some aspects, as described above in connection with, for example, FIG. 8B, the multiple transmission occasions include a first set of transmission occasions in which the default beam is associated with a first TCI state, of the multiple TCI states associated with the CORESET, and a second set of transmission occasions in which the default beam is associated with a second TCI state, of the multiple TCI states associated with the CORESET. In some aspects, the multiple transmission occasions include a first set of transmission occasions in which the default beam is associated with a lowest TCI identifier, of TCI identifiers associated with the multiple TCI states associated with the CORESET, and a second set of transmission occasions in which the default beam is associated with a highest TCI identifier, of the TCI identifiers associated with the multiple TCI states associated with the CORESET. In some aspects, the multiple transmission occasions include at least a first set of transmission occasions and a second set of transmission occasions associated with a cyclic mapping, a sequential mapping, a DMRS CDM group index, or frequency allocation parts.

At 1030, the UE may transmit the uplink data channel using the default beam. For example, the UE (e.g., using transmission component 1304, depicted in FIG. 13) may transmit the uplink data channel using the default beam, as described above in connection with, for example, FIGS. 8A-8B at 814, 820, 830, and 832.

Although FIG. 10 shows example blocks of method 1000, in some aspects, method 1000 may include additional blocks, fewer blocks, different blocks, or differently arranged blocks than those depicted in FIG. 10. Additionally, or alternatively, two or more of the blocks of method 1000 may be performed in parallel.

Figure 11:
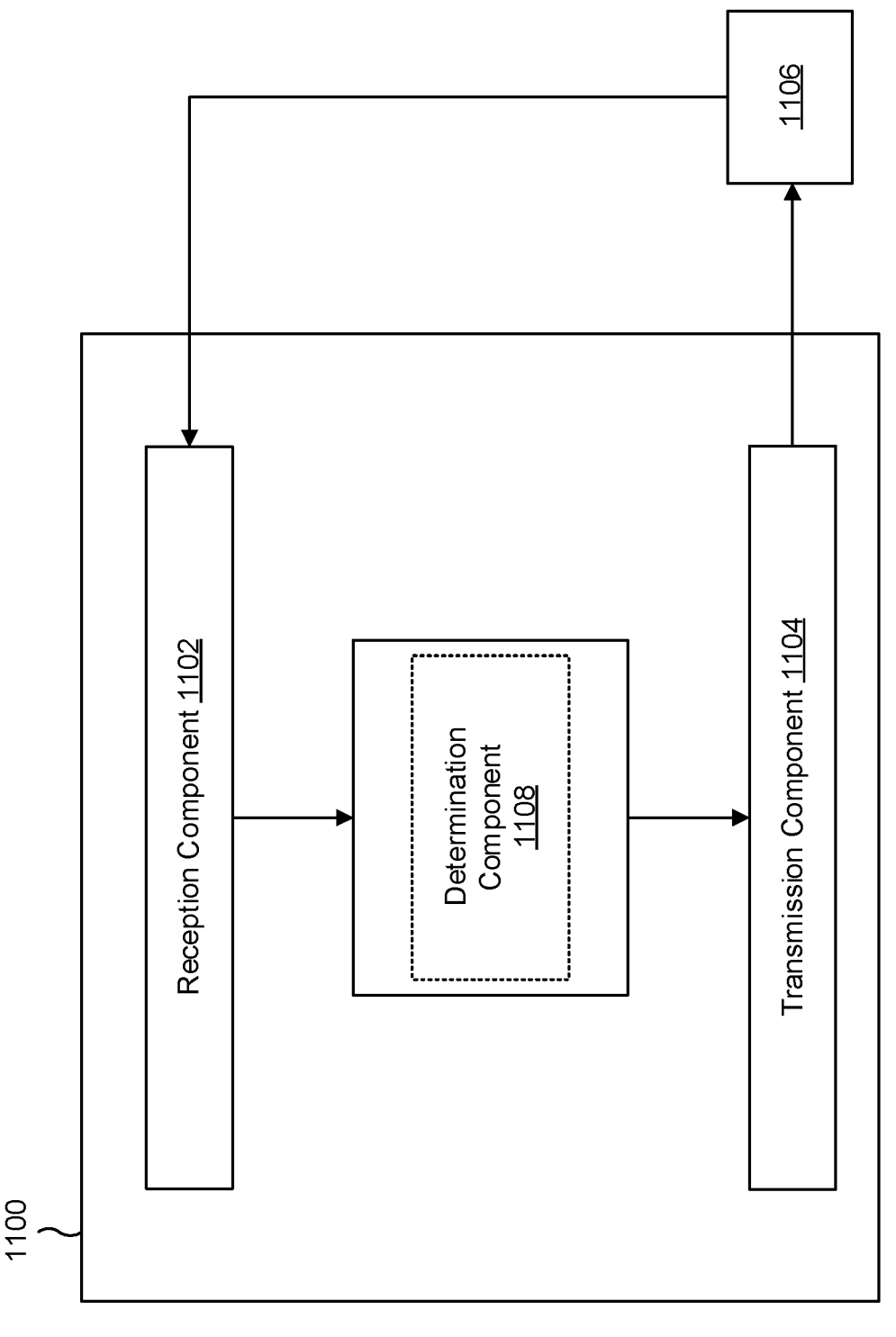
FIG. 11 is a diagram of an example apparatus for wireless communication.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 7A-7D and/or FIGS. 8A-8B. Additionally, or alternatively, the apparatus 1100 may be configured to perform one or more methods described herein, such as the method 900 of FIG. 9, the method 1000 of FIG. 10, or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The reception component 1102 may receive, from a base station, DCI scheduling a downlink data channel, wherein the DCI is associated with a repetition configuration including one or more of multiple CORESETs or multiple TCI states associated with a CORESET. The determination component 1108 may determine a default beam for the downlink data channel based at least in part on the repetition configuration associated with the DCI, wherein the default beam is determined based at least in part on the multiple CORESETs or the multiple TCI states associated with the CORESET. The reception component 1102 may receive the downlink data channel using the default beam.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
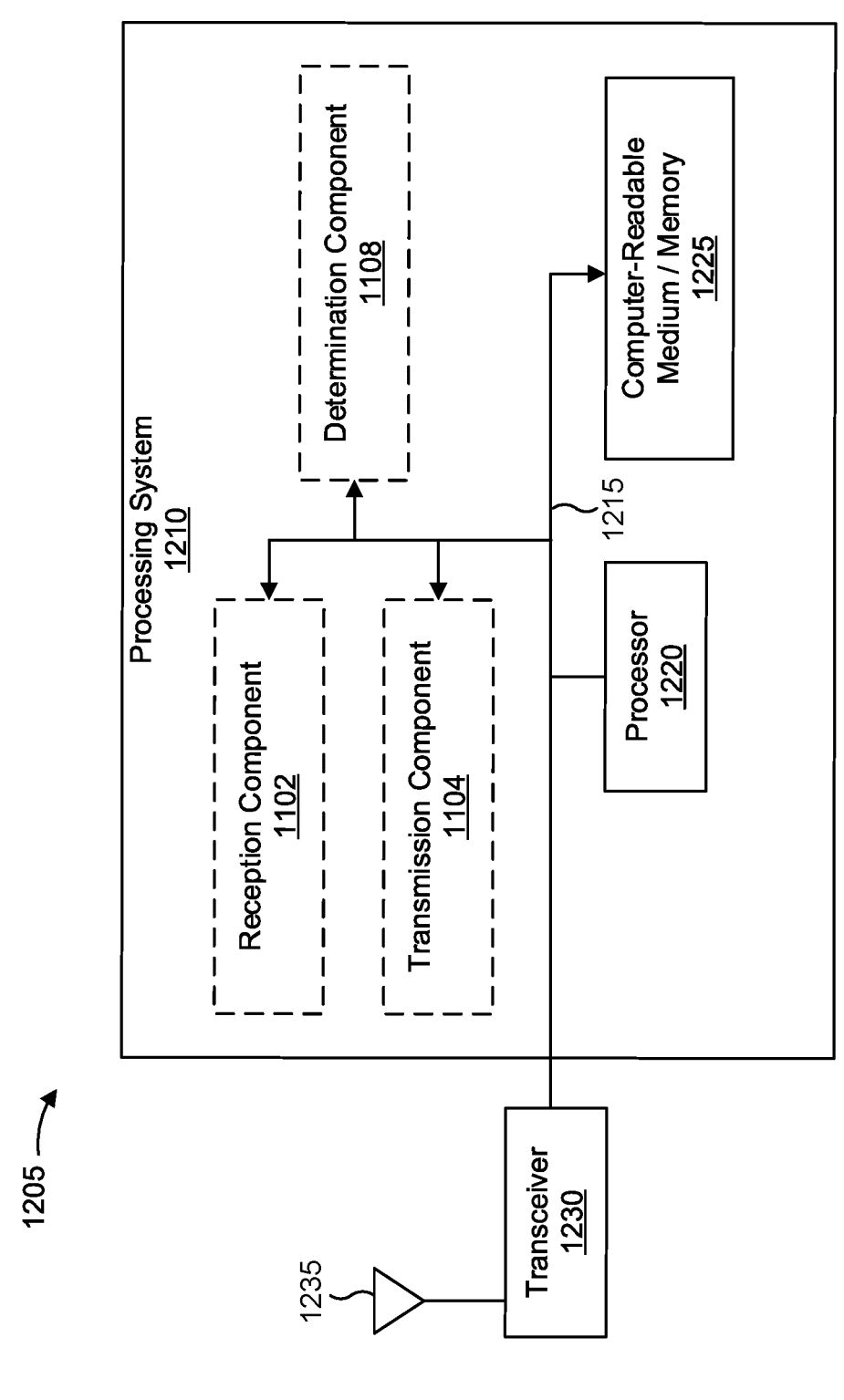
FIG. 12 is a diagram illustrating an example of a hardware implementation for an apparatus employing a processing system.

FIG. 12 is a diagram illustrating an example 1200 of a hardware implementation for an apparatus 1205 employing a processing system 1210. The apparatus 1205 may be a UE.

The processing system 1210 may be implemented with a bus architecture, represented generally by the bus 1215. The bus 1215 may include any number of interconnecting buses and bridges depending on the specific application of the processing system 1210 and the overall design constraints. The bus 1215 links together various circuits including one or more processors and/or hardware components, represented by the processor 1220, the illustrated components, and the computer-readable medium/memory 1225. The bus 1215 may also link various other circuits, such as timing sources, peripherals, voltage regulators, power management circuits, or the like.

The processing system 1210 may be coupled to a transceiver 1230. The transceiver 1230 is coupled to one or more antennas 1235. The transceiver 1230 provides a means for communicating with various other apparatuses over a transmission medium. The transceiver 1230 receives a signal from the one or more antennas 1235, extracts information from the received signal, and provides the extracted information to the processing system 1210, specifically the reception component 1102. In addition, the transceiver 1230 receives information from the processing system 1210, specifically the transmission component 1104, and generates a signal to be applied to the one or more antennas 1235 based at least in part on the received information.

The processing system 1210 includes a processor 1220 coupled to a computer-readable medium/memory 1225. The processor 1220 is responsible for general processing, including the execution of software stored on the computer-readable medium/memory 1225. The software, when executed by the processor 1220, causes the processing system 1210 to perform the various functions described herein for any particular apparatus. The computer-readable medium/memory 1225 may also be used for storing data that is manipulated by the processor 1220 when executing software. The processing system further includes at least one of the illustrated components. The components may be software modules running in the processor 1220, resident/stored in the computer readable medium/memory 1225, one or more hardware modules coupled to the processor 1220, or some combination thereof.

In some aspects, the processing system 1210 may be a component of the UE 120 and may include the memory 282 and/or at least one of the TX MIMO processor 266, the RX processor 258, and/or the controller/processor 280. In some aspects, the apparatus 1205 for wireless communication includes means for receiving, from a base station, DCI scheduling a downlink data channel, wherein the DCI is associated with a repetition configuration including one or more of multiple CORESETs or multiple TCI states associated with a CORESET, means for determining a default beam for the downlink data channel based at least in part on the repetition configuration associated with the DCI, wherein the default beam is determined based at least in part on the multiple CORESETs or the multiple TCI states associated with the CORESET, and means for receiving the downlink data channel using the default beam. The aforementioned means may be one or more of the aforementioned components of the apparatus 1100 and/or the processing system 1210 of the apparatus 1205 configured to perform the functions recited by the aforementioned means. As described elsewhere herein, the processing system 1210 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 12 is provided as an example. Other examples may differ from what is described in connection with FIG. 12.

Figure 13:
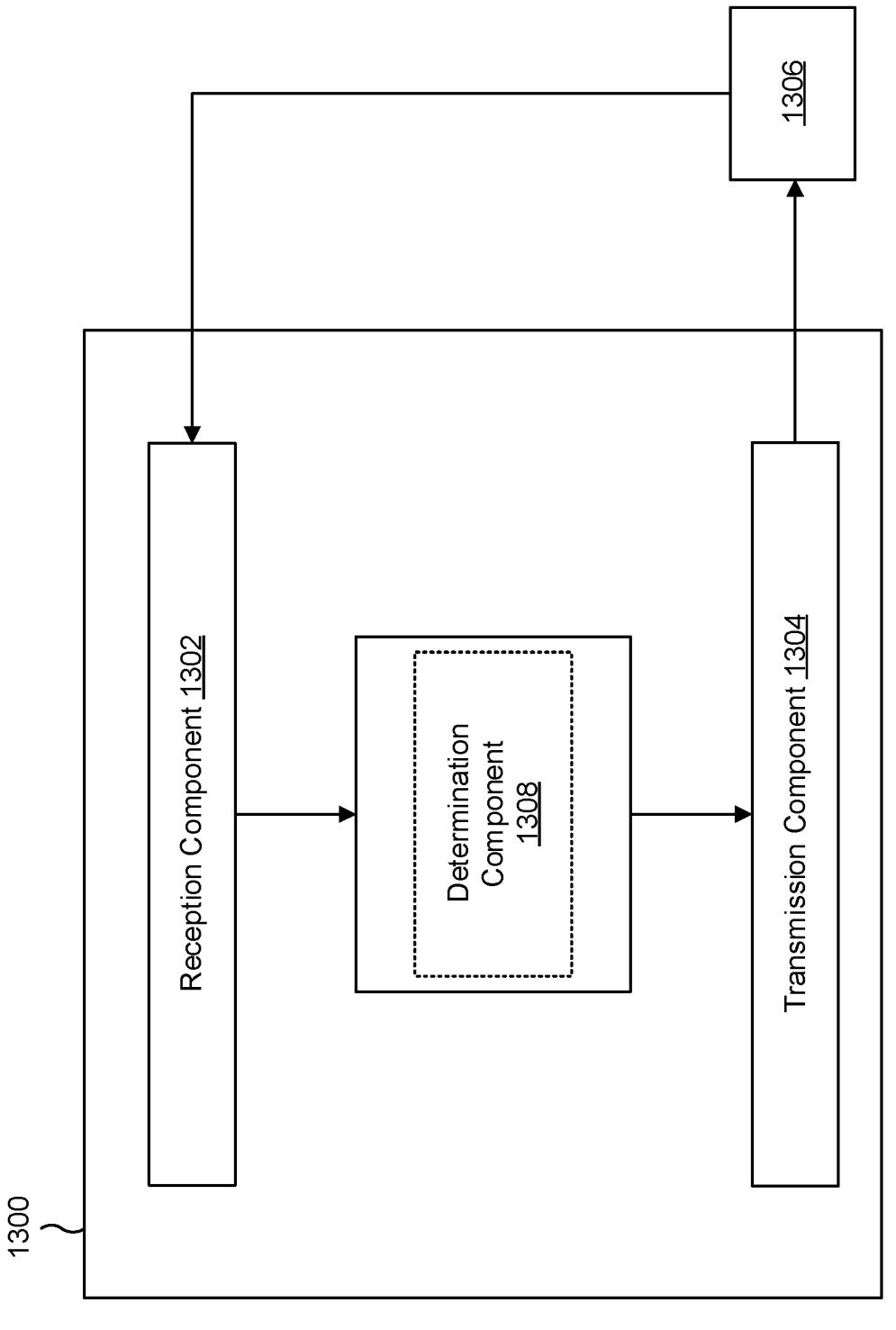
FIG. 13 is a diagram of an example apparatus for wireless communication.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a determination component 1308, among other examples.

In some aspects, the apparatus 1300 may be configured to perform one or more operations described herein in connection with FIGS. 7A-7D and/or FIGS. 8A-8B. Additionally, or alternatively, the apparatus 1300 may be configured to perform one or more methods described herein, such as method 900 of FIG. 9, method 1000 of FIG. 10, or a combination thereof. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The reception component 1302 may receive, from a base station, DCI scheduling an uplink data channel, wherein the DCI is associated with a repetition configuration including a CORESET associated with multiple TCI states. The determination component 1308 may determine a default beam for the uplink data channel based at least in part on the repetition configuration associated with the DCI, wherein the default beam is determined based at least in part on the multiple TCI states associated with the CORESET. The transmission component 1304 may transmit the uplink data channel using the default beam.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
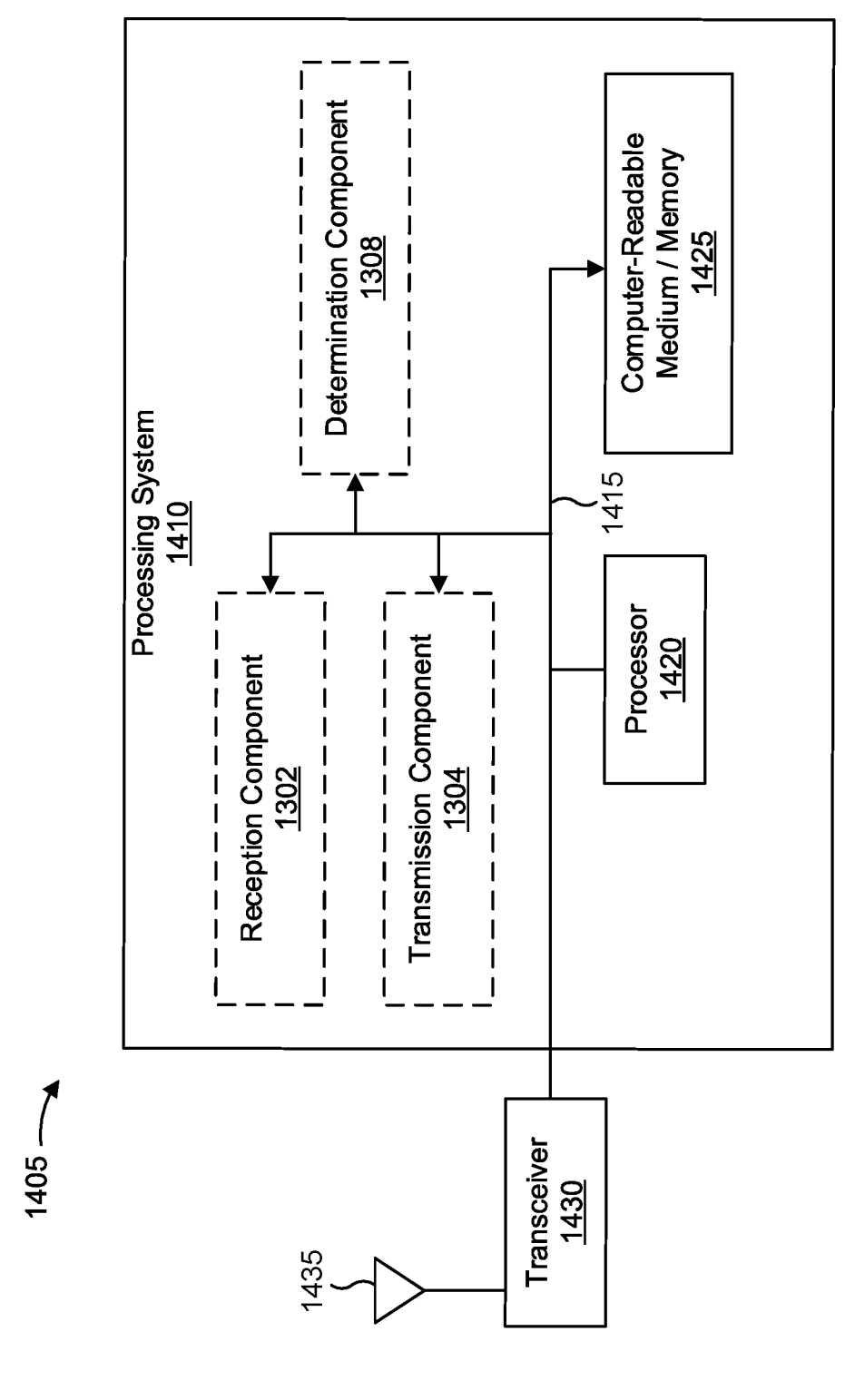
FIG. 14 is a diagram illustrating an example of a hardware implementation for an apparatus employing a processing system.

FIG. 14 is a diagram illustrating an example 1400 of a hardware implementation for an apparatus 1405 employing a processing system 1410. The apparatus 1405 may be a UE.

The processing system 1410 may be implemented with a bus architecture, represented generally by the bus 1415. The bus 1415 may include any number of interconnecting buses and bridges depending on the specific application of the processing system 1410 and the overall design constraints. The bus 1415 links together various circuits including one or more processors and/or hardware components, represented by the processor 1420, the illustrated components, and the computer-readable medium/memory 1425. The bus 1415 may also link various other circuits, such as timing sources, peripherals, voltage regulators, power management circuits, or the like.

The processing system 1410 may be coupled to a transceiver 1430. The transceiver 1430 is coupled to one or more antennas 1435. The transceiver 1430 provides a means for communicating with various other apparatuses over a transmission medium. The transceiver 1430 receives a signal from the one or more antennas 1435, extracts information from the received signal, and provides the extracted information to the processing system 1410, specifically the reception component 1302. In addition, the transceiver 1430 receives information from the processing system 1410, specifically the transmission component 1304, and generates a signal to be applied to the one or more antennas 1435 based at least in part on the received information.

The processing system 1410 includes a processor 1420 coupled to a computer-readable medium/memory 1425. The processor 1420 is responsible for general processing, including the execution of software stored on the computer-readable medium/memory 1425. The software, when executed by the processor 1420, causes the processing system 1410 to perform the various functions described herein for any particular apparatus. The computer-readable medium/memory 1425 may also be used for storing data that is manipulated by the processor 1420 when executing software. The processing system further includes at least one of the illustrated components. The components may be software modules running in the processor 1420, resident/stored in the computer readable medium/memory 1425, one or more hardware modules coupled to the processor 1420, or some combination thereof.

In some aspects, the processing system 1410 may be a component of the UE 120 and may include the memory 282 and/or at least one of the TX MIMO processor 266, the RX processor 258, and/or the controller/processor 280. In some aspects, the apparatus 1405 for wireless communication includes means for receiving, from a base station, DCI scheduling an uplink data channel, wherein the DCI is associated with a repetition configuration including a CORESET associated with multiple TCI states, means for determining a default beam for the uplink data channel based at least in part on the repetition configuration associated with the DCI, wherein the default beam is determined based at least in part on the multiple TCI states associated with the CORESET, and means for transmitting the uplink data channel using the default beam. The aforementioned means may be one or more of the aforementioned components of the apparatus 1300 and/or the processing system 1410 of the apparatus 1405 configured to perform the functions recited by the aforementioned means. As described elsewhere herein, the processing system 1410 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 14 is provided as an example. Other examples may differ from what is described in connection with FIG. 14.

The following provides an overview of aspects of the present disclosure:

Aspect 1: A method of wireless communication performed by a UE, comprising: receiving, from a base station, DCI scheduling a downlink data channel, wherein the DCI is associated with a repetition configuration including one or more of multiple CORESETs or multiple TCI states associated with a CORESET; determining a default beam for the downlink data channel based at least in part on the repetition configuration associated with the DCI, wherein the default beam is determined based at least in part on the multiple CORESETs or the multiple TCI states associated with the CORESET; and receiving the downlink data channel using the default beam.

Aspect 2: The method of aspect 1, wherein the downlink data channel is associated with a single reception occasion, and wherein the repetition configuration associated with the DCI includes the multiple CORESETs.

Aspect 3: The method of aspect 2, wherein the default beam is associated with a TCI state or a QCL assumption applied for one of the multiple CORESETs having a lowest CORESET identifier.

Aspect 4: The method of aspect 2, wherein the default beam is associated with a TCI state or a QCL assumption applied for one of the multiple CORESETs associated with a search space having a lowest search space identifier or one of the multiple CORESETs associated with a search space having a highest search space identifier.

Aspect 5: The method of aspect 2, wherein the default beam is associated with a TCI state or a QCL assumption applied for one of the multiple CORESETs associated with a monitored search space that is latest in time or one of the multiple CORESETs associated with a monitored search space that is earliest in time.

Aspect 6: The method of any of aspects 2-5, wherein the default beam is associated with a first TCI state and a second TCI state that are respectively associated with a first CORESET and a second CORESET, of the multiple CORESETs, based at least in part on the downlink data channel having an SFN configuration.

Aspect 7: The method of aspect 1, wherein the downlink data channel is associated with a single reception occasion, and wherein the repetition configuration associated with the DCI includes the CORESET associated with the multiple TCI states.

Aspect 8: The method of aspect 7, wherein the default beam is associated with a first TCI state, of the multiple TCI states associated with the CORESET.

Aspect 9: The method of aspect 7, wherein the default beam is associated with a lowest TCI identifier, of TCI identifiers associated with the multiple TCI states associated with the CORESET.

Aspect 10: The method of aspect 7, wherein the default beam is associated with a TCI identifier, of TCI identifiers associated with the multiple TCI states associated with the CORESET, that is QCLed with an SSB having a lowest index.

Aspect 11: The method of any of aspects 7-10, wherein the default beam is associated with a first TCI state and a second TCI state, of the multiple TCI states associated with the CORESET, based at least in part on the downlink data channel having an SFN configuration.

Aspect 12: The method of aspect 1, wherein the downlink data channel is configured with multiple reception occasions, and wherein the repetition configuration associated with the DCI includes the multiple CORESETs.

Aspect 13: The method of aspect 12, wherein the multiple reception occasions include: a first set of reception occasions in which the default beam is associated with one of the multiple CORESETs having a lowest CORESET identifier, and a second set of reception occasions in which the default beam is associated with one of the multiple CORESETs having a highest CORESET identifier.

Aspect 14: The method of aspect 12, wherein the multiple reception occasions include: a first set of reception occasions in which the default beam is associated with one of the multiple CORESETs associated with a search space having a lowest search space identifier, and a second set of reception occasions in which the default beam is associated with one of the multiple CORESETs associated with a search space having a highest search space identifier.

Aspect 15: The method of aspect 12, wherein the multiple reception occasions include: a first set of reception occasions in which the default beam is associated with one of the multiple CORESETs associated with a monitored search space that is latest in time, and a second set of reception occasions in which the default beam is associated with one of the multiple CORESETs associated with a monitored search space that is earliest in time.

Aspect 16: The method of any of aspects 12-15, wherein the multiple reception occasions include at least a first set of reception occasions and a second set of reception occasions associated with a cyclic mapping, a sequential mapping, a DMRS CDM group index, or frequency allocation parts.

Aspect 17: The method of aspect 1, wherein the downlink data channel is configured with multiple reception occasions, and wherein the repetition configuration associated with the DCI includes the CORESET associated with the multiple TCI states.

Aspect 18: The method of aspect 17, wherein the multiple reception occasions include: a first set of reception occasions in which the default beam is associated with a first TCI state, of the multiple TCI states associated with the CORESET, and a second set of reception occasions in which the default beam is associated with a second TCI state, of the multiple TCI states associated with the CORESET.

Aspect 19: The method of aspect 17, wherein the multiple reception occasions include: a first set of reception occasions in which the default beam is associated with a lowest TCI identifier, of TCI identifiers associated with the multiple TCI states associated with the CORESET, and a second set of reception occasions in which the default beam is associated with a highest TCI identifier, of the TCI identifiers associated with the multiple TCI states associated with the CORESET.

Aspect 20: The method of aspect 17, wherein the multiple reception occasions include: a first set of reception occasions in which the default beam is associated with a first TCI identifier, of TCI identifiers associated with the multiple TCI states associated with the CORESET, that is QCLed with an SSB having a lowest index, and a second set of reception occasions in which the default beam is associated with a second TCI identifier, of the TCI identifiers associated with the multiple TCI states associated with the CORESET, that is QCLed with an SSB having a highest index.

Aspect 21: A method of wireless communication performed by a UE, comprising: receiving, from a base station, DCI scheduling an uplink data channel, wherein the DCI is associated with a repetition configuration including a CORESET associated with multiple TCI states; determining a default beam for the uplink data channel based at least in part on the repetition configuration associated with the DCI, wherein the default beam is determined based at least in part on the multiple TCI states associated with the CORESET; and transmitting the uplink data channel using the default beam.

Aspect 22: The method of aspect 21, wherein the uplink data channel is associated with a single transmission occasion.

Aspect 23: The method of aspect 22, wherein the default beam is associated with a first TCI state, of the multiple TCI states associated with the CORESET.

Aspect 24: The method of aspect 22, wherein the default beam is associated with a lowest TCI identifier, of TCI identifiers associated with the multiple TCI states associated with the CORESET.

Aspect 25: The method of aspect 22, wherein the default beam is associated with a TCI identifier, of TCI identifiers associated with the multiple TCI states associated with the CORESET, that is QCLed with an SSB having a lowest index.

Aspect 26: The method of aspect 21, wherein the uplink data channel is configured with multiple transmission occasions.

Aspect 27: The method of aspect 26, wherein the multiple transmission occasions include: a first set of transmission occasions in which the default beam is associated with a first TCI state, of the multiple TCI states associated with the CORESET, and a second set of transmission occasions in which the default beam is associated with a second TCI state, of the multiple TCI states associated with the CORESET.

Aspect 28: The method of aspect 26, wherein the multiple transmission occasions include: a first set of transmission occasions in which the default beam is associated with a lowest TCI identifier, of TCI identifiers associated with the multiple TCI states associated with the CORESET, and a second set of transmission occasions in which the default beam is associated with a highest TCI identifier, of the TCI identifiers associated with the multiple TCI states associated with the CORESET.

Aspect 29: The method of aspect 26, wherein the multiple transmission occasions include at least a first set of transmission occasions and a second set of transmission occasions associated with a cyclic mapping, a sequential mapping, a DMRS CDM group index, or frequency allocation parts.

Aspect 30: An apparatus for wireless communication at a device, comprising a processor; memory coupled with the processor; and instructions stored in the memory and executable by the processor to cause the apparatus to perform the method of any of aspects 1-20.

Aspect 31: A device for wireless communication, comprising a memory and one or more processors coupled to the memory, the memory and the one or more processors configured to perform the method of any of aspects 1-20.

Aspect 32: An apparatus for wireless communication, comprising at least one means for performing the method of any of aspects 1-20.

Aspect 33: A non-transitory computer-readable medium storing code for wireless communication, the code comprising instructions executable by a processor to perform the method of any of aspects 1-20.

Aspect 34: A non-transitory computer-readable medium storing a set of instructions for wireless communication, the set of instructions comprising one or more instructions that, when executed by one or more processors of a device, cause the device to perform the method of any of aspects 1-20.

Aspect 30: An apparatus for wireless communication at a device, comprising a processor; memory coupled with the processor; and instructions stored in the memory and executable by the processor to cause the apparatus to perform the method of any of aspects 21-29.

Aspect 31: A device for wireless communication, comprising a memory and one or more processors coupled to the memory, the memory and the one or more processors configured to perform the method of any of aspects 21-29.

Aspect 32: An apparatus for wireless communication, comprising at least one means for performing the method of any of aspects 21-29.

Aspect 33: A non-transitory computer-readable medium storing code for wireless communication, the code comprising instructions executable by a processor to perform the method of any of aspects 21-29.

Aspect 34: A non-transitory computer-readable medium storing a set of instructions for wireless communication, the set of instructions comprising one or more instructions that, when executed by one or more processors of a device, cause the device to perform the method of any of aspects 21-29.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of:

a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a base station, downlink control information (DCI) scheduling a downlink data channel without a transmission configuration indication (TCI) field, wherein the DCI is associated with a repetition configuration of a physical downlink control channel (PDCCH), the repetition configuration indicating whether the PDCCH is associated with multiple control resource sets (CORESETs) or multiple TCI states associated with a CORESET;
   determining a default beam for the downlink data channel based at least in part on the repetition configuration, wherein the default beam is determined based at least in part on one of the multiple CORESETs or one or a plurality of the multiple TCI states associated with the CORESET, wherein either one or the plurality of the multiple TCI states that are used in determining the default beam based at least in part on whether the downlink data channel is associated with a single frequency network (SFN) repetition configuration; and
   receiving the downlink data channel using the default beam.

2. The method of claim 1, wherein the downlink data channel is associated with a single reception occasion, and wherein the repetition configuration associated with the DCI includes the multiple CORESETs.

3. The method of claim 2, wherein the default beam is associated with a TCI state or a quasi co-location assumption applied for one of the multiple CORESETs having a lowest CORESET identifier.

4. The method of claim 2, wherein the default beam is associated with a TCI state or a quasi co-location assumption applied for one of the multiple CORESETs associated with a search space having a lowest search space identifier or one of the multiple CORESETs associated with a search space having a highest search space identifier.

5. The method of claim 2, wherein the default beam is associated with a TCI state or a quasi co-location assumption applied for one of the multiple CORESETs associated with a monitored search space that is latest in time or one of the multiple CORESETs associated with a monitored search space that is earliest in time.

6. The method of claim 2, wherein the default beam is associated with a first TCI state and a second TCI state that are respectively associated with a first CORESET and a second CORESET, of the multiple CORESETs, based at least in part on the downlink data channel having a single frequency network configuration.

7. The method of claim 1, wherein the downlink data channel is associated with a single reception occasion, and wherein the repetition configuration associated with the DCI includes the CORESET associated with the multiple TCI states.

8. The method of claim 7, wherein the default beam is associated with a first TCI state, of the multiple TCI states associated with the CORESET.

9. The method of claim 7, wherein the default beam is associated with a lowest TCI identifier, of TCI identifiers associated with the multiple TCI states associated with the CORESET.

10. The method of claim 7, wherein the default beam is associated with a TCI identifier, of TCI identifiers associated with the multiple TCI states associated with the CORESET, that is quasi co-located with a synchronization signal block having a lowest index.

11. The method of claim 7, wherein the default beam is associated with a first TCI state and a second TCI state, of the multiple TCI states associated with the CORESET, based at least in part on the downlink data channel having a single frequency network configuration.

12. The method of claim 1, wherein the downlink data channel is configured with multiple reception occasions, and wherein the repetition configuration associated with the DCI includes the multiple CORESETs.

13. The method of claim 12, wherein the multiple reception occasions include:
   a first set of reception occasions in which the default beam is associated with one of the multiple CORESETs having a lowest CORESET identifier, and
   a second set of reception occasions in which the default beam is associated with one of the multiple CORESETs having a highest CORESET identifier.

14. The method of claim 12, wherein the multiple reception occasions include:
   a first set of reception occasions in which the default beam is associated with one of the multiple CORESETs associated with a search space having a lowest search space identifier, and
   a second set of reception occasions in which the default beam is associated with one of the multiple CORESETs associated with a search space having a highest search space identifier.

15. The method of claim 12, wherein the multiple reception occasions include:
   a first set of reception occasions in which the default beam is associated with one of the multiple CORESETs associated with a monitored search space that is latest in time, and
   a second set of reception occasions in which the default beam is associated with one of the multiple CORESETs associated with a monitored search space that is earliest in time.

16. The method of claim 12, wherein the multiple reception occasions include at least a first set of reception occasions and a second set of reception occasions associated with a cyclic mapping, a sequential mapping, a demodulation reference signal (DMRS) code division multiplexing group index, or frequency allocation parts.

17. The method of claim 1, wherein the downlink data channel is configured with multiple reception occasions, and wherein the repetition configuration associated with the DCI includes the CORESET associated with the multiple TCI states.

18. The method of claim 17, wherein the multiple reception occasions include:
a first set of reception occasions in which the default beam is associated with a first TCI state, of the multiple TCI states associated with the CORESET, and
a second set of reception occasions in which the default beam is associated with a second TCI state, of the multiple TCI states associated with the CORESET.

19. The method of claim 17, wherein the multiple reception occasions include:
a first set of reception occasions in which the default beam is associated with a lowest TCI identifier, of TCI identifiers associated with the multiple TCI states associated with the CORESET, and
a second set of reception occasions in which the default beam is associated with a highest TCI identifier, of the TCI identifiers associated with the multiple TCI states associated with the CORESET.

20. The method of claim 17, wherein the multiple reception occasions include:
a first set of reception occasions in which the default beam is associated with a first TCI identifier, of TCI identifiers associated with the multiple TCI states associated with the CORESET, that is quasi co-located (QCLed) with a synchronization signal block (SSB) having a lowest index, and
a second set of reception occasions in which the default beam is associated with a second TCI identifier, of the TCI identifiers associated with the multiple TCI states associated with the CORESET, that is QCLed with an SSB having a highest index.

21. A method of wireless communication performed by a user equipment (UE), comprising:
receiving, from a base station, downlink control information (DCI) scheduling an uplink data channel without a transmission configuration indication (TCI) field, wherein the DCI is associated with a repetition configuration of a physical downlink control channel (PDCCH), the repetition configuration indicating whether the PDCCH is associated with a control resource set (CORESET) associated with multiple TCI states;
determining a default beam for the uplink data channel based at least in part on the repetition configuration associated with the DCI, wherein the default beam is determined based at least in part on the multiple TCI states associated with the CORESET; and
transmitting the uplink data channel using the default beam.

22. The method of claim 21, wherein the uplink data channel is associated with a single transmission occasion.

23. The method of claim 22, wherein the default beam is associated with a first TCI state, of the multiple TCI states associated with the CORESET.

24. The method of claim 22, wherein the default beam is associated with a lowest TCI identifier, of TCI identifiers associated with the multiple TCI states associated with the CORESET.

25. The method of claim 22, wherein the default beam is associated with a TCI identifier, of TCI identifiers associated with the multiple TCI states associated with the CORESET, that is quasi co-located with a synchronization signal block having a lowest index.

26. The method of claim 21, wherein the uplink data channel is configured with multiple transmission occasions that include:
a first set of transmission occasions in which the default beam is associated with a first TCI state, of the multiple TCI states associated with the CORESET, and
a second set of transmission occasions in which the default beam is associated with a second TCI state, of the multiple TCI states associated with the CORESET.

27. The method of claim 21, wherein the uplink data channel is configured with multiple transmission occasions that include:
a first set of transmission occasions in which the default beam is associated with a lowest TCI identifier, of TCI identifiers associated with the multiple TCI states associated with the CORESET, and
a second set of transmission occasions in which the default beam is associated with a highest TCI identifier, of the TCI identifiers associated with the multiple TCI states associated with the CORESET.

28. The method of claim 21, wherein the uplink data channel is configured with multiple transmission occasions that include at least a first set of transmission occasions and a second set of transmission occasions associated with a cyclic mapping, a sequential mapping, a demodulation reference signal (DMRS) code division multiplexing group index, or frequency allocation parts.

29. A user equipment (UE), comprising:
one or more memories; and
one or more processors, communicatively coupled to the one or more memories, configured to:
receive, from a base station, downlink control information (DCI) scheduling a downlink data channel without a transmission configuration indication (TCI) field, wherein the DCI is associated with a repetition configuration of a physical downlink control channel (PDCCH), the repetition configuration indicating whether the PDCCH is associated with multiple control resource sets (CORESETs) or multiple TCI states associated with a CORESET;
determine a default beam for the downlink data channel based at least in part on the repetition configuration, wherein the default beam is determined based at least in part on one of the multiple CORESETs or one or a plurality of the multiple TCI states associated with the CORESET, wherein either one or the plurality of the multiple TCI states that are used in determining the default beam based at least in part on whether the downlink data channel is associated with a single frequency network (SFN) repetition configuration; and
receive the downlink data channel using the default beam.

30. A user equipment (UE), comprising:
one or more memories; and
one or more processors, communicatively coupled to the one or more memories, configured to:
receive, from a base station, downlink control information (DCI) scheduling an uplink data channel without a transmission configuration indication (TCI) field, wherein the DCI is associated with a repetition configuration of a physical downlink control channel (PDCCH), the repetition configuration indicating whether the PDCCH is associated with a control resource set (CORESET) associated with multiple TCI states;

determine a default beam for the uplink data channel based at least in part on the repetition configuration associated with the DCI, wherein the default beam is determined based at least in part on the multiple TCI states associated with the CORESET; and transmit the uplink data channel using the default beam.

* * * * *